United States Patent
Li

(10) Patent No.: US 12,554,371 B2
(45) Date of Patent: Feb. 17, 2026

(54) WINDOW DISPLAY METHOD AND RELATED APPARATUS

(71) Applicant: HUAWEI TECHNOLOGIES CO., LTD., Shenzhen (CN)

(72) Inventor: Xu Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/025,310

(22) Filed: Jan. 16, 2025

(65) Prior Publication Data

US 2025/0231658 A1 Jul. 17, 2025

Related U.S. Application Data

(63) Continuation of application No. 18/477,270, filed on Sep. 28, 2023, now Pat. No. 12,265,688, which is a continuation of application No. PCT/CN2022/083405, filed on Mar. 28, 2022.

(30) Foreign Application Priority Data

Mar. 30, 2021 (CN) .......................... 202110343796.0

(51) Int. Cl.
*G06F 3/0481* (2022.01)
(52) U.S. Cl.
CPC .................................. *G06F 3/0481* (2013.01)
(58) Field of Classification Search
None
See application file for complete search history.

(56) References Cited

U.S. PATENT DOCUMENTS

| | | |
|---|---|---|
| 2006/0236264 A1 | 10/2006 | Cain et al. |
| 2009/0210820 A1 | 8/2009 | Adachi et al. |
| 2015/0074566 A1* | 3/2015 | Lee ..................... G06F 3/04847 715/763 |
| 2017/0139496 A1* | 5/2017 | Kang ..................... G06F 3/0484 |
| 2025/0130825 A1* | 4/2025 | Liu ........................ G06F 3/0484 |

FOREIGN PATENT DOCUMENTS

| | | |
|---|---|---|
| CN | 107704147 A | 2/2018 |
| CN | 107861679 A | 3/2018 |
| CN | 108540646 A | 9/2018 |
| CN | 111552425 A | 8/2020 |

* cited by examiner

*Primary Examiner* — Stephen T. Reed
(74) *Attorney, Agent, or Firm* — Leydig, Voit & Mayer, Ltd.

(57) ABSTRACT

Embodiments of this application provide a window display method and a related apparatus. The method includes: An electronic device displays a first window. The electronic device determines a hot region of the first window based on a first display region of the first window, where the first display region includes a display region of a response control in the first window, and the response control is a control capable of responding to a touch operation. According to embodiments of this application, the hot region of the window can be determined based on a display region of display content in the window. In this way, an operable region for a user on a display screen is increased, and screen utilization is effectively improved.

15 Claims, 24 Drawing Sheets

WINDOW DISPLAY METHOD AND RELATED APPARATUS

CROSS-REFERENCE TO RELATED APPLICATIONS

This application is a continuation of U.S. patent application Ser. No. 18/477,270, filed on Sep. 28, 2023, which is a continuation of International Application No. PCT/CN2022/083405, filed on Mar. 28, 2022, which claims priority to Chinese Patent Application No. 202110343796.0, filed on Mar. 30, 2021. All of the aforementioned patent applications are hereby incorporated by reference in their entireties.

TECHNICAL FIELD

This application relates to the field of electronic technologies, and in particular, to a window display method and a related apparatus.

BACKGROUND

Currently, an electronic device such as a mobile phone or a tablet may display various windows. When a plurality of windows are simultaneously displayed, a user usually chooses to reduce a window on which no operation is performed temporarily, to avoid excessive occupation of visible space and operable space for the user on a display screen of the electronic device.

However, when the electronic device displays a window, part of information that the user does not pay attention to is displayed in the window. The part of information occupies too much visible space and operable space on the display screen of the electronic device. As a result, operable space for the user on another window is small, and screen utilization is reduced.

SUMMARY

This application provides a window display method and a related apparatus, to improve screen utilization and effectively improve user experience.

According to a first aspect, this application provides a window display method. The method includes: An electronic device displays a first window. The electronic device determines a hot region of the first window based on a first display region of the first window. The first display region includes a display region of a response control in the first window, and the response control is a control capable of responding to a touch operation. According to the embodiments of this application, the hot region of the window can be determined based on a display region of display content in the window. In this way, an operable region for a user on a display screen is increased, and screen utilization is effectively improved.

In an embodiment, before the electronic device determines a hot region of the first window based on a first display region of the first window, the method further includes: The electronic device reduces first display content of the first window when the first window meets a preset condition. That the electronic device determines a hot region of the first window based on a first display region of the first window further includes: The electronic device reduces the hot region of the first window to a first hot region based on the first display region. The first display region includes the display region of the response control in the first window in which the first display content is reduced. According to embodiments of this application, when the display content of the first window is reduced, the electronic device reduces the hot region of the first window based on a display region of the reduced display content, thereby adaptively increasing an operable region for a user on a display screen, and improving screen utilization.

In an embodiment, the first window includes a first control, the preset condition is that a first operation performed on the first control in the first window is detected, and the first display content includes display content other than the first control in the first window. According to embodiments of this application, after determining a control that the user is concerned about in the first window, the electronic device may reduce other display content that the user is not concerned about in the first window based on a display region of the control, and may further reduce the hot region of the first window based on a display region of the reduced display content, to increase the operable region for the user on the display screen and improve the screen utilization.

In an embodiment, the preset condition is that no input operation performed on the first window is detected within preset duration. According to embodiments of this application, when the user does not pay attention to the first window for a long time, the display content of the first window may be reduced, and the hot region of the first window may be reduced based on the display region of the reduced display content, to increase the operable region for the user on the display screen and improve the screen utilization.

In an embodiment, the first window is a floating ball window, and the first display content is a floating ball in the floating ball window.

In an embodiment, the preset condition is that a second operation performed on the first window is detected, the second operation is for reducing display content of the first window, and the first display content includes all display content of the first window. According to embodiments of this application, after the second operation for reducing the first window visually is detected, the electronic device may reduce the hot region of the first window based on the display region of the reduced display content while reducing the display content of the first window, to increase the operable region for the user on the display screen and improve the screen utilization.

In an embodiment, that an electronic device displays a first window further includes: The electronic device displays the first window in full screen.

In an embodiment, that an electronic device displays a first window includes: The electronic device displays the first window in a first user interface. The first user interface includes a fourth control. Before the hot region of the first window is reduced to the first hot region, the hot region of the first window covers a hot region of the fourth control. After the hot region of the first window is reduced to the first hot region, the hot region of the first window does not cover the hot region of the fourth control. According to embodiments of this application, when the display content of the window is reduced, the hot region of the first window is reduced based on the display region of the reduced display content, to enable the fourth control originally covered by the hot region of the first window to receive and respond to the input operation of the user, thereby increasing the operable region for the user on the display screen, and improving the screen utilization.

In an embodiment, compared with a size of a region occupied by the first window on the display screen before the electronic device reduces the first display content of the first window, a size of a region occupied by the first window on the display screen remains unchanged after the electronic device reduces the first display content of the first window.

In an embodiment, that the electronic device reduces the hot region of the first window to a first hot region based on the first display region includes: The electronic device reduces the hot region of the first window to the first hot region based on a position and a size of the first display region. The first hot region includes the first display region.

In an embodiment, a size of the first hot region is greater than the size of the first display region. Embodiments of this application are implemented to avoid a situation in which the user cannot accurately operate the window when the display content of the first window is too small.

In an embodiment, when a size of the first display region is less than a first preset value, the size of the first hot region is determined based on the size of the first display region.

In an embodiment, the first hot region is a region is obtained through enlarging the first display region based on a preset proportion, or the first hot region is a region obtained through extending the first display region all around by a preset length. In embodiments of this application, the first hot region includes the first display region. When the size of the first hot region is less than the size of the first display region, how to determine the first hot region based on the first display region is not specifically limited.

In embodiments of this application, the electronic device may determine an initial state of the first window that is before the first display content is reduced and a final state of the first window in which the first display content is reduced. How the initial state of the first window changes to the final state of the first window is not limited herein. For example, in a change process, the display content of the first window may gradually change, jump, rotate, and/or change transparency.

In an embodiment, when the electronic device reduces first display content of the first window, the method further includes: increasing transparency of the first display content.

In an embodiment, the first display content includes a second control and a third control, and when the electronic device reduces first display content of the first window, the method further includes: increasing transparency of the second control, and keeping transparency of the third control unchanged.

In an embodiment, the first display region includes display regions of all controls in the first window in which the first display content is reduced. It may be understood that, in embodiments of this application, the first display region is determined based on the display region of the response control in the first window, or the first display region is determined based on the display regions of all the controls in the first window.

In an embodiment, that the electronic device reduces first display content of the first window includes: adjusting a display position of the first display content, and reducing a size of the first display content based on a display position and/or a size of the first control.

In an embodiment, after the electronic device reduces first display content of the first window, a display region of the first display content includes a display region of the first control. Alternatively, after the electronic device reduces first display content of the first window, a display region of the first control includes a display region of the first display content.

In an embodiment, the method further includes: The electronic device further performs a response event corresponding to the first operation in response to the first operation.

In an embodiment, that the electronic device reduces the hot region of the first window to a first hot region based on the first display region includes: When a size of the display regions of all the display content in the first window is less than a second preset value, the electronic device reduces the hot region of the first window to the first hot region based on the first display region.

According to a second aspect, this application provides an electronic device. The electronic device includes:
a display unit, configured to display a first window; and
a determining unit, configured to determine a hot region of the first window based on a first display region of the first window. The first display region includes a display region of a response control in the first window, and the response control is a control capable of responding to a touch operation.

In an embodiment, the electronic device further includes a reduction unit. Before the determining unit determines the hot region of the first window based on the first display region of the first window, the reduction unit is configured to reduce first display content of the first window when the first window meets a preset condition; and the determining unit is further configured to reduce the hot region of the first window to a first hot region based on the first display region. The first display region includes the display region of the response control in the first window in which the first display content is reduced.

In an embodiment, the first window includes a first control, the preset condition is that a first operation performed on the first control in the first window is detected, and the first display content includes display content other than the first control in the first window.

In an embodiment, the preset condition is that no input operation performed on the first window is detected within preset duration.

In an embodiment, the preset condition is that a second operation performed on the first window is detected, the second operation is for reducing display content of the first window, and the first display content includes all display content of the first window.

In an embodiment, the display unit is further configured to display the first window in full screen.

In an embodiment, the display unit is further configured to display the first window in a first user interface. The first user interface includes a fourth control. Before the hot region of the first window is reduced to the first hot region, the hot region of the first window covers a hot region of the fourth control. After the hot region of the first window is reduced to the first hot region, the hot region of the first window does not cover the hot region of the fourth control.

In an embodiment, compared with a size of a region occupied by the first window on a display screen before the reduction unit reduces the first display content of the first window, a size of a region occupied by the first window on the display screen remains unchanged after the reduction unit reduces the first display content of the first window.

In an embodiment, when a size of the first display region is less than a first preset value, the size of the first hot region is determined based on the size of the first display region.

According to a third aspect, an electronic device is provided, including: a communication interface, a memory, and a processor. The communication interface and the memory are coupled to the processor. The memory is configured to store computer program code. The computer program code includes computer instructions. When the processor reads the computer instructions from the memory, the electronic device is enabled to perform any possible implementation of the first aspect.

According to a fourth aspect, a computer-readable storage medium is provided. The computer-readable storage medium includes instructions. When the foregoing instructions are run on an electronic device, the electronic device is enabled to perform any possible implementation of the first aspect.

According to a fifth aspect, a computer product is provided. When the computer program product is run on a computer, the computer is enabled to perform any possible implementation of the first aspect.

BRIEF DESCRIPTION OF DRAWINGS

To describe the technical solutions in embodiments of this application more clearly, the following describes the accompanying drawings used in describing the embodiments of this application.

DESCRIPTION OF EMBODIMENTS

The following clearly and completely describes technical solutions in embodiments of this application with reference to the accompanying drawings in the embodiments of this application.

Terms used in the following embodiments of this application are merely intended to describe specific embodiments, and are not intended to be used as a contrast or as a limitation on this application. In the description of embodiments of this application, unless otherwise specified, "/" represents "or". For example, A/B may represent A or B. "and/or" in the text is only an association relationship that describes associated objects, and indicates that three relationships may exist. For example, A and/or B may indicate: Only A exists, both A and B exist, and only B exists. In addition, in the description of embodiments of this application, "a plurality of" means two or more.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following first describes an example electronic device 100 provided in the following embodiments of this application.

Figure 1:
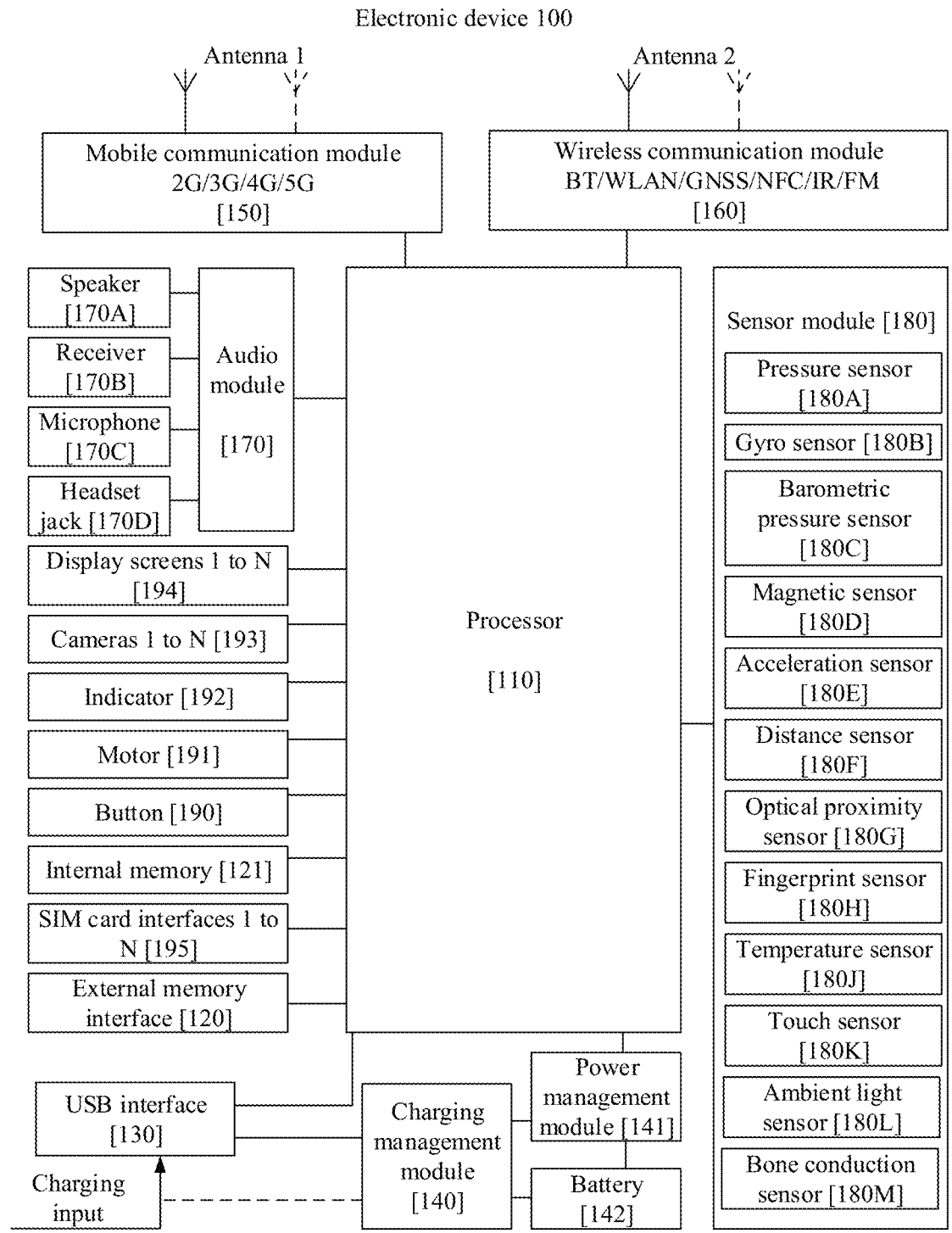
FIG. 1 is a schematic structural diagram of an electronic device according to an embodiment of this application.

FIG. 1 illustratively shows a schematic structural diagram of the electronic device 100.

The electronic device 100 may be a mobile phone, a tablet, a desktop computer, a laptop computer, a hand-held computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart home device, and/or a smart city device. A specific type of the electronic device is not specially limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module ( ) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, etc.

It may be understood that the structure shown in embodiments of the present invention does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), etc. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (serial data line, SDA) and a serial clock line (SCL). In some embodiments, the processor 110 may include multiple groups of I2C buses. The processor 110 may be separately coupled to the touch sensor 180K, a charger, a camera flash, the camera 193, and the like via different I2C bus interfaces. Now, let's see some examples. The processor 110 may be coupled to the touch sensor 180K via the I2C interface, so that the processor 110 communicates with the touch sensor 180K via the I2C bus interface, to implement a touch function of the electronic device 100.

The I2S interface can be used for audio communication. In some embodiments, the processor 110 may include multiple groups of I2S buses. The processor 110 may be coupled to the audio module 170 via the I2S bus, to implement communication between the processor 110 and the audio module 170. In some embodiments, the audio module 170 may transmit an audio signal to the wireless communication module 160 via the I2S interface, to implement a function of answering a call via a Bluetooth headset.

The PCM interface can also be used for audio communication, sampling, quantizing, and encoding analog signals. In some embodiments, the audio module 170 and the wireless communication module 160 may be coupled via a PCM bus interface. In some embodiments, the audio module 170 may alternatively transmit the audio signal to the wireless communication module 160 via the PCM interface, to implement the function of answering a call via a Bluetooth headset. Both the I2S interface and the PCM interface may be used for audio communication.

The UART interface is a universal serial data bus for asynchronous communication. The bus may be a bidirectional communication bus. The bidirectional communication bus converts the data to be transmitted between serial communication and parallel communication. In some embodiments, the UART interface is generally configured to connect the processor 110 with the wireless communication module 160. Now, let's see some examples. The processor 110 communicates with a Bluetooth module in the wireless communication module 160 via the UART interface, to implement a Bluetooth function. In some embodiments, the audio module 170 may transmit the audio signal to the wireless communication module 160 via the UART interface, to implement a function of playing music via a Bluetooth headset.

The MIPI interface may be configured to connect the processor 110 with a peripheral device such as the display screen 194 or the camera 193. The MIPI interface includes a camera serial interface (CSI), a display serial interface (DSI), and the like. In some embodiments, the processor 110 communicates with the camera 193 via a CSI interface, to implement a shooting function of the electronic device 100. The processor 110 communicates with the display screen 194 via a DSI interface, to implement a display function of the electronic device 100.

The GPIO interface can be configured by software. The GPIO interface can be configured as a control signal or a data signal. In some embodiments, the GPIO interface may be configured to connect the processor 110 with the camera 193, the display screen 194, the wireless communication module 160, the audio module 170, the sensor module 180, and the like. The GPIO interface can also be configured as an I2C interface, an I2S interface, a UART interface, or an MIPI interface.

The USB interface 130 is an interface that conforms to a USB standard specification, and may be specifically a Mini USB interface, a Micro USB interface, a USB Type C interface, or the like. The USB interface 130 may be configured to connect to the charger to charge the electronic device 100, or may be configured to perform data transmission between the electronic device 100 and the peripheral device. Alternatively, the USB interface may be configured to connect to a headset for playing audio through the headset. The interface may be further configured to connect to another electronic device, for example, an AR device. It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive wireless charging input via a wireless charging coil of the electronic device 100. When charging the battery 142, the charging management module 140 may further supply power to the electronic device via the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communication module 160, and the like. The power management module 141 may be further configured to monitor a parameter such as a battery capacity, a battery cycle count, or a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further reused, to improve antenna utilization. Now, let's see some examples. The antenna 1 may be reused as a diversity antenna of a wireless local area network. In some other embodiments, an antenna may be used in combination with a tuning switch.

The mobile communication module 150 may provide a solution applied to the electronic device 100 for wireless communications including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display screen 194. In some embodiments, the modem processor may be an independent device. In some other embodiments, the modem processor may be independent of the processor 110, and is disposed in a same device as the mobile communication module 150 or another functional module.

The wireless communication module 160 may provide a solution applied to the electronic device 100 for wireless communications including wireless local area networks (WLAN) (such as a wireless fidelity (Wi-Fi) network), Bluetooth (BT), global navigation satellite system (GNSS), frequency modulation (FM), near field communication (NFC), infrared (IR), and the like. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, and perform frequency modulation and amplification on the signal. The amplified signal is converted into an electromagnetic wave and radiated out via the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by a wireless communication technology. The wireless communication technology may include a global system for mobile communications ( ) a general packet radio service (GPRS), code division multiple access (CDMA), wideband code division multiple access (WCDMA), time-division code division multiple access (TD-SCDMA), long term evolution (LTE), a BT, a GNSS, a WLAN, an NFC, an FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements the display function by the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute program instructions to generate or change display information.

The display screen 194 is configured to display an image, a video, or the like. The display screen 194 includes a display panel. The display panel may be a liquid crystal display (LCD), an organic light-emitting diode (OLED), an active-matrix organic light-emitting diode ( ) a flexible light-emitting diode (FLED), a mini-LED, a micro-LED, a micro-OLED, quantum dot light-emitting diodes (QLED), or the like. In some embodiments, the electronic device 100 may include 1 or N display screens 194, where N is a positive integer greater than 1.

The internal memory 121 may include one or more random access memories (RAM) and one or more nonvolatile memories (NVM). The random access memory may include a static random-access memory (SRAM), a dynamic random access memory (DRAM), a synchronous dynamic random access memory (SDRAM), a double data rate synchronous dynamic random access memory (DDR SDRAM, for example, a fifth generation DDR SDRAM is usually referred to as a DDR5 SDRAM), and the like. The nonvolatile memory may include a magnetic disk storage device and a flash memory. The flash memory may be divided into NOR FLASH, NAND FLASH, 3D NAND FLASH, and the like based on an operation principle, may be divided into a single-level cell (SLC), a multi-level cell (MLC), a triple-level cell (TLC), a quad-level cell (QLC), and the like based on electrical potential orders of memory cells, and may be divided into a universal flash storage (UFS), embedded multi media card (eMMC), and the like based on a storage specification. In some embodiments, the random access memory may be directly read and written by the processor 110, and may be configured to store an executable program (for example, machine instructions) of an operating system or another running program, or may be configured to store data of a user, an application, and the like. The nonvolatile memory may also store an executable program, data of a user, data of an application, and the like, which may be loaded into the random access memory in advance for directly reading and writing by the processor 110.

The external memory interface 120 may be configured to connect to an external non-volatile memory, to expand a storage capability of the electronic device 100. The external non-volatile memory communicates with the processor 110 via the external memory interface 120, to implement a data storage function. For example, files such as music and videos are stored in the external non-volatile memory.

The electronic device 100 may implement audio functions by the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some function modules of the audio module 170 may be disposed in the processor 110.

The speaker 170A, also referred to as a "loudspeaker", is configured to convert an audio electrical signal into a sound signal. The electronic device 100 may listen to music or listen to a hands-free call through the speaker 170A.

The receiver 170B, also referred to as an "earpiece", is configured to convert an audio electrical signal into a sound signal. When the electronic device 100 answers a call or a voice message, the receiver 170B may be placed close to a human ear to answer a voice.

The microphone 170C, also referred to as a "mike" or a "mic", is configured to convert a sound signal into an electrical signal. When making a call or sending a voice message, the user may make a sound by approaching the microphone 170C through his/her mouth, and input a sound signal to the microphone 170C. The electronic device 100 may be provided with at least one microphone 170C. In some other embodiments, two microphones 170C may be disposed in the electronic device 100, to implement a noise reduction function in addition to collecting a sound signal. In some other embodiments, three, four, or more microphones 170C may alternatively be disposed in the electronic device 100, to collect a sound signal, reduce noise, identify a sound source, implement a directional recording function, and the like.

The headset jack 170D is configured to connect a wired headset. The headset jack 170D may be the USB interface 130, or may be a 3.5 mm open mobile terminal platform (open mobile terminal platform, OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates having an electrically conductive material. When a force is applied to the pressure sensor 180A, a capacitance between electrodes changes. The electronic device 100 determines intensity of the pressure based on the change of the capacitance. When a touch operation is performed on the display screen 194, the electronic device 100 detects intensity of the touch operation based on the pressure sensor 180A. The electronic device 100 may also calculate a touch position based on a detection signal of the pressure sensor 180A. In some embodiments, touch operations that are performed at a same touch position but have different touch operation intensities may correspond to different operation instructions. Now, let's see some examples. When a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a motion posture of the electronic device 100. In some embodiments, an angular velocity of the electronic device 100 around three axes (that is, axes x, y, and z) may be determined through the gyro sensor 180B. The gyro sensor 180B may be used for image stabilization. For example, when a shutter is pressed, the gyro sensor 180B detects an angle of shaking of the electronic device 100, and calculates a distance that needs to be compensated by a lens module based on the angle, to enable the lens to counteract the shaking of the electronic device 100 through reverse motion, thereby implementing the image stabilization. The gyro sensor 180B may also be used for navigation and motion-controlled gaming scenarios.

The barometric pressure sensor 180C is configured to measure atmospheric pressure. In some embodiments, the electronic device 100 calculates an altitude by using an atmospheric pressure value measured by the barometric pressure sensor 180C, to assist in positioning and navigation.

The magnetic sensor 180D includes a Hall effect sensor. The electronic device 100 may detect opening and closing of a flip leather cover using the magnetic sensor 180D. In some embodiments, when the electronic device 100 is a flip phone, the electronic device 100 may detect opening and closing of a flip based on the magnetic sensor 180D. Then, a feature such as automatic unlocking of the flip is set based on the detected opening and closing state of the leather cover or the detected opening and closing state of the flip.

The acceleration sensor 180E may detect magnitudes of accelerations of the electronic device 100 in all directions (usually on three axes). A magnitude and a direction of gravity may be detected when the electronic device 100 is static. It may also be used to identify a posture of an electronic device, and is applied to applications such as landscape/portrait mode switching, a pedometer, and the like.

The distance sensor 180F is configured to measure a distance. The electronic device 100 may measure the distance through infrared or laser. In some embodiments, in a shooting scene, the electronic device 100 may measure a distance using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The electronic device 100 emits infrared light outwards through the light-emitting diode. The electronic device 100 detects infrared reflected light from a nearby object using the photodiode. When plenty of reflected light is detected, it can be determined that there is an object near the electronic device 100. When insufficient reflected light is detected, the electronic device 100 may determine that there is no object near the electronic device 100. The electronic device 100 may detect that the user holds the electronic device 100 close to an ear for a call using the optical proximity sensor 180G, to automatically turn off the screen to save power. The optical proximity sensor 180G may also be used in a leather cover mode or a pocket mode to automatically perform screen unlocking or locking.

The ambient light sensor 180L is configured to sense ambient luminance. The electronic device 100 may adaptively adjust luminance of the display screen 194 based on the perceived ambient luminance. The ambient light sensor 180L may also be configured to automatically adjust the white balance when taking photos. The ambient light sensor 180L may further work with the optical proximity sensor 180G to detect whether the electronic device 100 is in a pocket, to prevent accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 performs a temperature processing policy by using the temperature detected by the temperature sensor 180J. For example, when the temperature reported by the temperature sensor 180J exceeds a threshold, the electronic device 100 reduces performance of a processor located near the temperature sensor 180J, to reduce power consumption and implement thermal protection. In some other embodiments, when the temperature is lower than another threshold, the electronic device 100 heats the battery 142, to avoid abnormal shutdown of the electronic device 100 caused by a low temperature. In some other embodiments, when the temperature is lower than yet another threshold, the electronic device 100 boosts an output voltage of the battery 142, to avoid abnormal shutdown caused by a low temperature.

The touch sensor 180K is also referred to as a "touch device". The touch sensor 180K may be disposed on the display screen 194, and the touch sensor 180K and the display screen 194 constitute a touchscreen, which is also referred to as a "touch panel". The touch sensor 180K is configured to detect a touch operation performed on or near the touch sensor. The touch sensor may transmit the detected touch operation to the application processor, to determine a touch event type. The display screen 194 may provide a visual output related to the touch operation. In some other embodiments, the touch sensor 180K may alternatively be disposed on a surface of the electronic device 100, and is at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button. The button 190 may also be a touch button. The electronic device 100 may receive a button input, and generate a key signal input related to a user setting and function control of the electronic device 100.

The motor 191 may generate a vibration alert. The motor 191 may be configured to provide an incoming call vibration prompt, or may be configured to provide a touch vibration feedback. For example, touch operations performed on different applications (such as photographing and audio playing) may correspond to different vibration feedback effects. For touch operations performed on different regions of the display screen 194, the motor 191 may also correspond to different vibration feedback effects. Different application scenarios (for example, time reminding, information receiving, an alarm clock, games, etc.) may also correspond to different vibration feedback effects. A touch vibration feedback effect can also be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195, or removed from the SIM card interface 195, to implement contact and separation from the electronic device 100.

In embodiments of this application, for a structure of an electronic device 200, refer to the structure of the electronic device 100 described in the related embodiment in FIG. 1.

The following describes related concepts involved in embodiments of this application.

Control: A control may be encapsulation of data and a method. The control may have its own attribute and method. The attribute is a simple accessor of control data, and the methods are simple and visible functions of the control. The control, also known as a widget, is a basic element of the user interface. For example, types of the controls may include, but are not limited to: user interface controls (controls for developing and building user interfaces, such as controls for interface elements such as windows, text boxes, buttons, and drop-down menus), chart controls (controls for developing charts, which can visualize data, etc.), report controls (controls for developing reports, which implement functions of browsing, viewing, designing, editing, and printing reports), and cell controls (controls for developing cells, which implement data processing and operation functions in grids). The types of the controls in embodiments of this application may further include: composite controls (combining existing controls to form a new control, centralizing performance of multiple controls), extended controls (deriving a new control from existing controls, to add new performance to the existing controls, or change the performance of the existing controls), and custom controls.

In embodiments of this application, the response control is a control capable of responding to a touch operation. It may be understood that, after detecting a touch operation (such as a tap, a long press, a slide, or the like) performed on a hot region of the response control, an electronic device performs a response event corresponding to the response control in response to the foregoing touch operation. The response control may be the foregoing user interface control, composite control, extended control, custom control, or the like. For example, a button and a drop-down menu are response controls.

Application window: An application window may be an application window in an Android system, or may be an application window in an iOS system, or may be an application window in another operating system. This is not specifically limited herein. One application includes a plurality of application windows, and one application window corresponds to one or more user interfaces. For ease of description, the application window may be referred to as a window for short in embodiments of this application. In embodiments of this application, the window may also be considered as a composite control.

Figure 3:
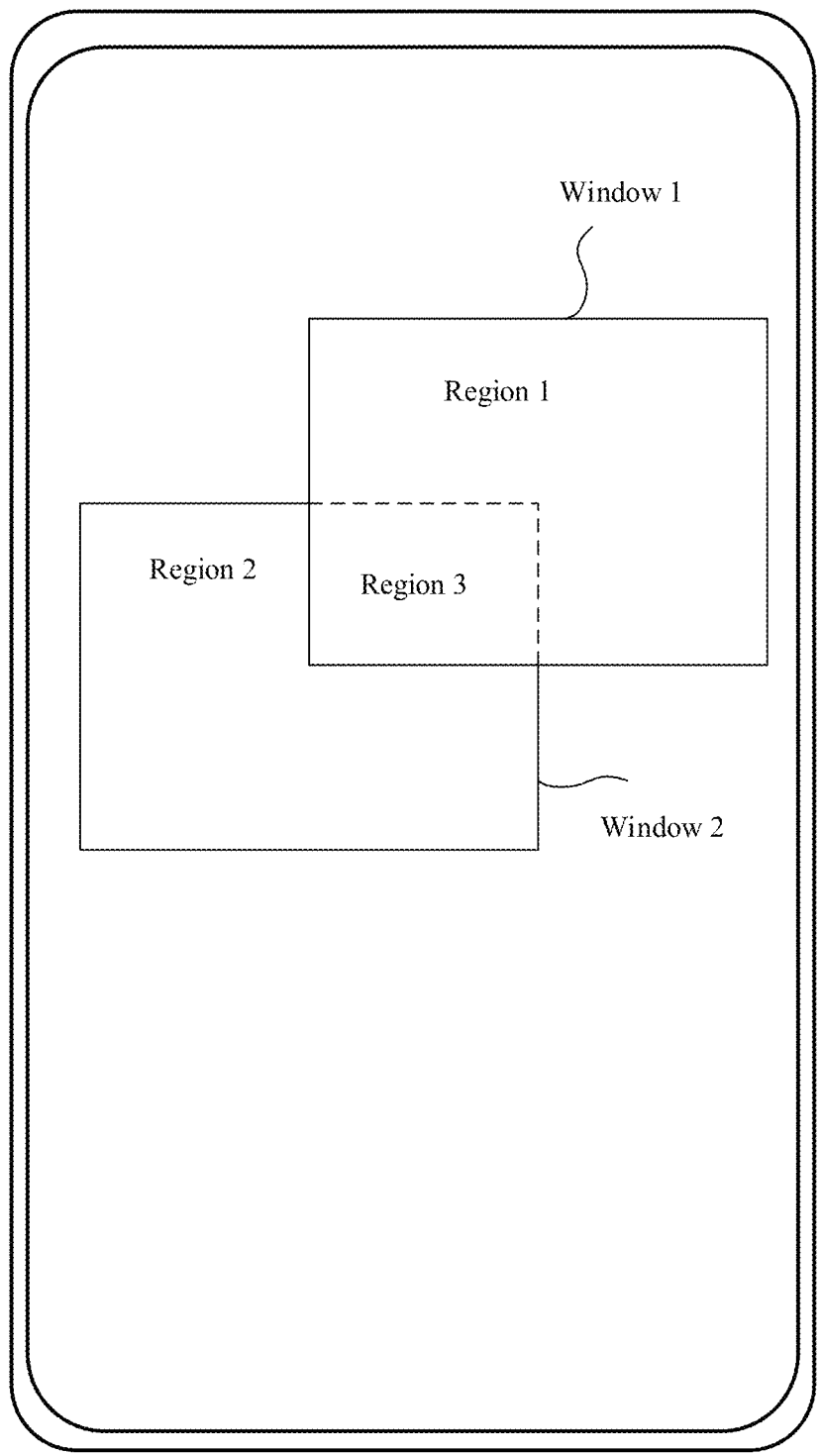
FIG. 3 is a schematic diagram of multi-window display according to an embodiment of this application.

Hot region: Each control corresponds to one control hot region, and each window also corresponds to one window hot region. In a conventional technology, the control hot region is determined based on a region occupied by the control on the display screen 194, and the window hot region is determined based on a region occupied by the window on the display screen 194. When the touch position of the touch operation performed by the user on the display screen 194 is within a window hot region range of a window 1, the touch operation is a user operation performed on the window 1. For example, as shown in FIG. 3, a display region of the window 1 occupies a region 1, and a display region of a window 2 occupies a region 2. Compared with an activity corresponding to the window 2, an activity corresponding to the window 1 is run recently. Therefore, in an overlapping region (namely, a region 3) of the window 1 and the window 2, the window 1 displayed by the electronic device 100 covers the window 2. Correspondingly, in the region 3, a hot region corresponding to the window 1 also covers a hot region corresponding to the window 2. Therefore, the touch operation received by the region 3 is a user operation performed on the window 1. For example, the window 2 displays a control 1 in the region 3. A region occupied by the control 1 receives a touch operation of the user. A control hot region of the control 1 is covered by a window hot region of the window 1. The control 1 cannot receive and respond to the foregoing touch operation.

In the Android system, the activity is an interface for interaction between a user and an application. Each activity component is associated with a window object, and is used to describe a specific application window. It can be learned that the activity is a highly abstract user interface component, and represents a user interface and a corresponding service logic centered on the user interface in Android. An event triggered by the user may be listened to and processed by the control in the user interface. It may be understood that in an Android application, one activity may be represented as one user interface, and one Android application may have a plurality of activities.

It should be noted that, the region occupied by the window and a display region in the window are two different concepts. The display region of the window is determined based on display regions of all controls in the window. For example, the electronic device may set a position and/or a size of the region occupied by the window via a first parameter. The electronic device may further set a position and/or a size of the display region of the window via a second parameter. The display region of the window includes the display regions of all the controls in the window. The first parameter may include a coordinate of an upper left point of the region occupied by the window, a width of the region, and a height of the region. The second parameter may include a coordinate of an upper left point of the display region of the window, a width of the region, and a height of the region. It may be understood that the coordinate of the upper left point of the region is used to represent a position of the region, and the width and the height of the region are used to represent a size of the region.

Animation: From a perspective of an influence range of an animation effect, animation in a View system of the electronic device 100 may be classified into a window animation, a View animation, and a layout animation. The window animation is animation corresponding to the window, and an object of the window animation is a surface (Surface). The window may be an application window corresponding to the activity, or may be a child window in the application window. The View animation is an animation performed on a specific View object. The View animation itself is an asymptotic process. The layout animation refers to animation included in a ViewGroup container object. The animation is defined in the ViewGroup object, but actually affects a subview in the container. The essential process of the layout animation is to set different animations for each subview based on the layout animation, to make it appear as if performed on the entire container as a whole.

Some example user interfaces (UI) involved in the electronic device 100 are described below.

Figure 4:
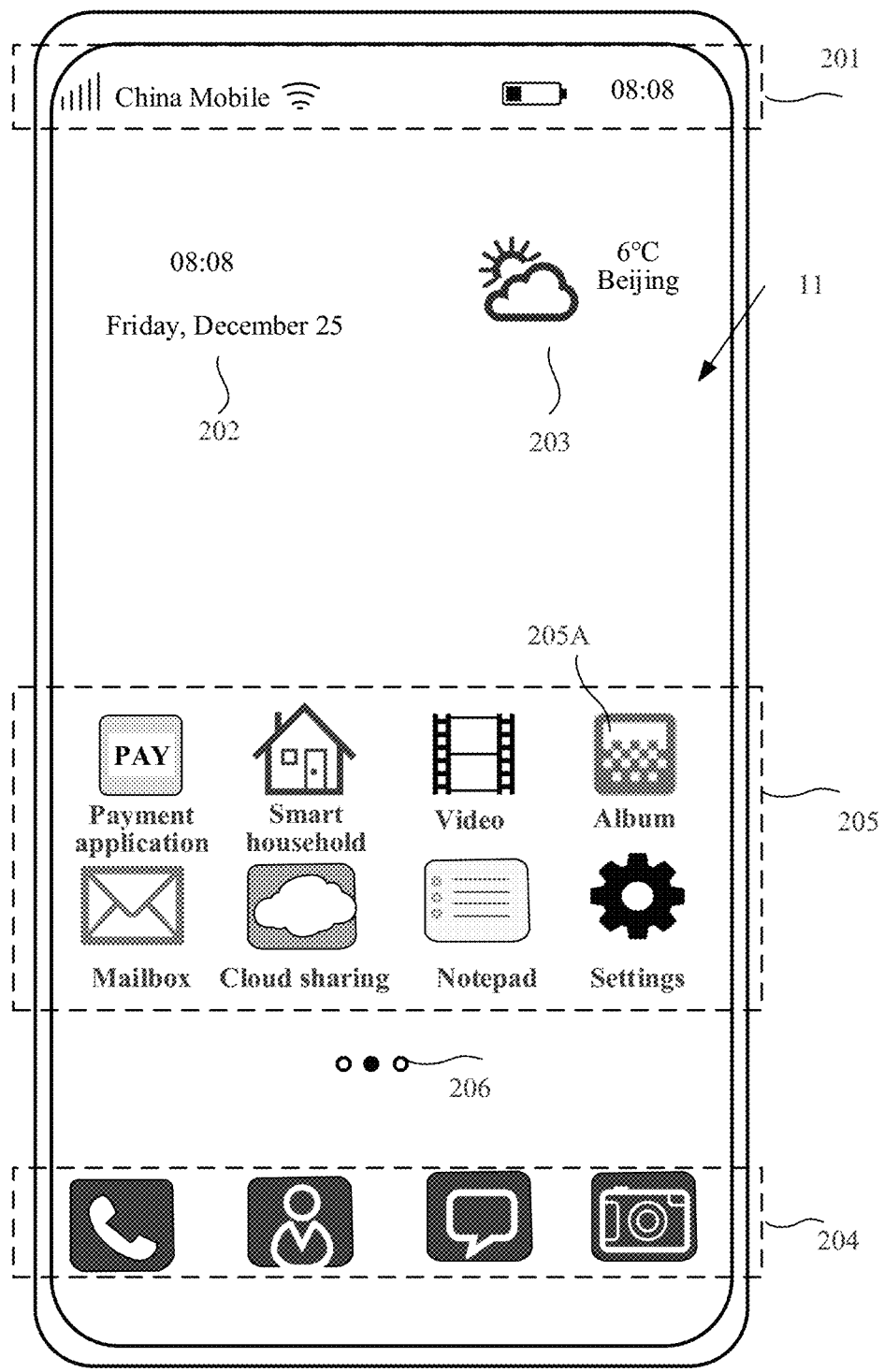
FIG. 4 is a schematic diagram of a user interface for displaying an application installed on an electronic device according to an embodiment of this application.

FIG. 4 illustratively shows a user interface 11 for displaying an application installed in the electronic device 100. The user interface 11 may include: a status bar 201, a calendar indicator 202, a weather indicator 203, a tray 204 with frequently used application icons, and a display region 205 for other application icons.

The tray 204 with frequently used application icons may display: a phone icon, a contact icon, an SMS message icon, and a camera icon.

The display region 205 of other application icons may display: a payment application icon, a smart home icon, a video icon, an album icon 205A, a mailbox icon, a cloud sharing icon, a memo icon, or a setting icon. The user interface 11 may also include a page indicator 206. Other application icons may be distributed on a plurality of pages, and the page indicator 206 may be used to indicate an application on which page the user is currently viewing. The user may swipe regions of other application icons left or right to view the application icons on other pages.

It may be understood that FIG. 4 merely shows the example of the user interface on the electronic device 100, and should not constitute a limitation on embodiments of this application.

The following describes several application scenarios of window display in the embodiments of this application.

Scenario 1

FIG. 5 to FIG. 8B illustratively show an application scenario of window display by using a volume adjustment window as an example.

Figure 5:
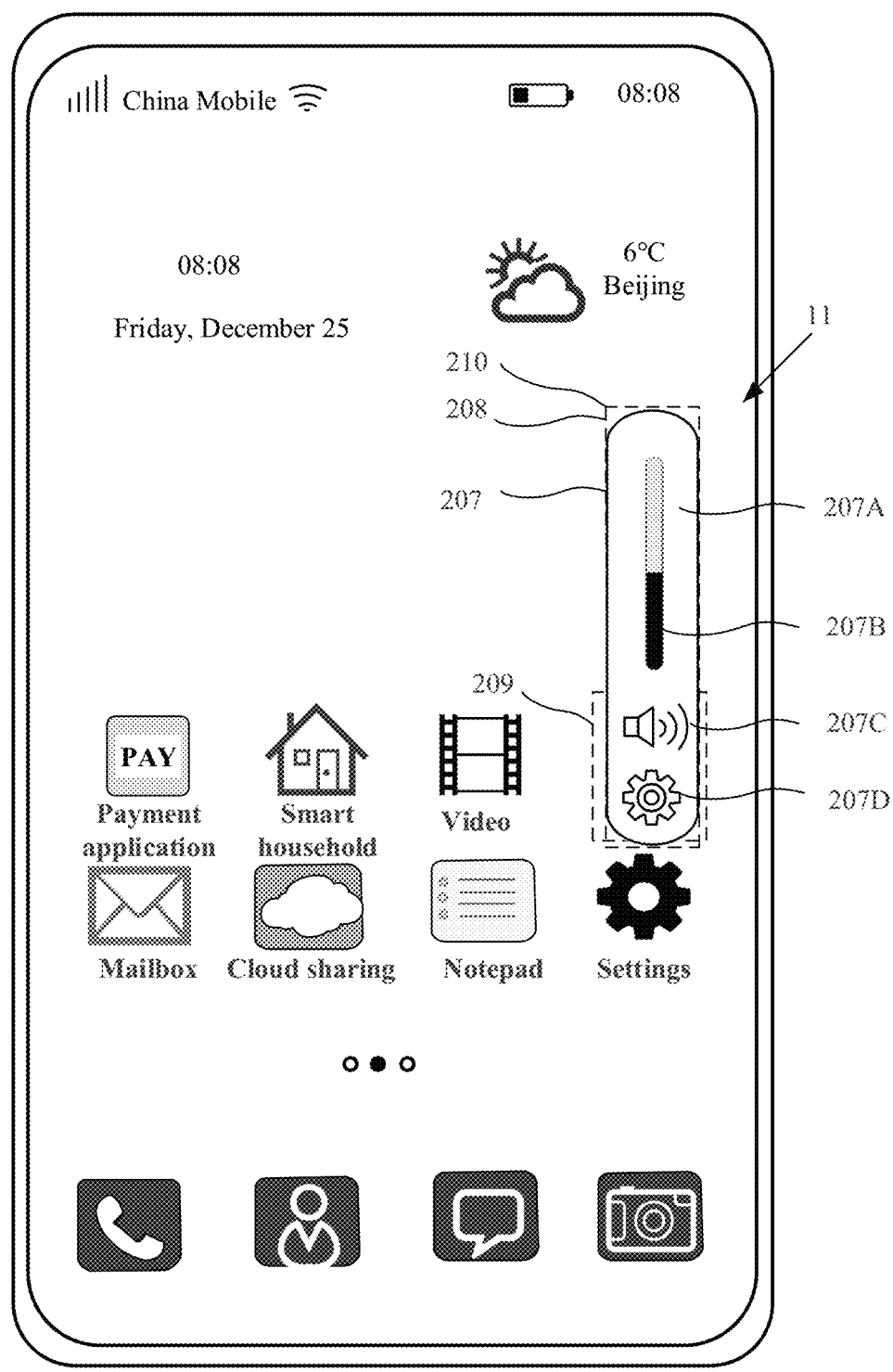
FIG. 5 is a schematic diagram of a display window according to an embodiment of this application.

The electronic device 100 receives a user operation (such as an operation of pressing the volume button on the electronic device 100). In response to the operation, the electronic device 100 may display a volume adjustment window 207 shown in FIG. 5. The volume adjustment window 207 is configured to display the display content related to volume adjustment. As shown in FIG. 5, all the display content in the volume adjustment window 207 (which may be referred to as display content 1 for short in this application) includes a volume panel 207A, a volume bar 207B, a speaker icon 207C, and a setting icon 207D. The volume bar 207B, the speaker icon 207C, and the setting icon 207D are response controls, and the volume panel 207A is a non-response control.

For example, as shown in FIG. 5, the display content 1 of the volume adjustment window 207 covers the album icon 205A, and a hot region 208 of the volume adjustment window 207 also covers a hot region 209 of the album icon 205A. Optionally, the hot region 208 of the volume adjustment window 207 shown in FIG. 5 is the same as a region 210 occupied by the window, and the region 210 occupied by the volume adjustment window 207 is preset by the electronic device 100 when the window is created.

The volume bar 207B includes a region 3 and a region 4 (for example, a black part at the bottom of the volume bar 207 shown in FIG. 5 is a region 3, and a white part at the top of the volume bar 207 is a region 4), a length of the region 3 represents a volume. The volume bar 207B may receive a sliding operation of the user. In response to the operation, the electronic device 100 adjusts the length of the region 3 of the volume bar 207B, and adjusts the volume based on the length of the region 3.

The speaker icon 207C receives an input operation of the user (e.g., a tap operation on the speaker icon 207C). In response to the input operation, the electronic device 100 may display an audio type selection box, where the audio type selection box of the electronic device 100 includes a ringtone, media, an alarm clock, and the like.

The setting icon 207D receives an input operation of the user (e.g., a tap operation on the setting icon 207D). In response to the input operation, the electronic device 100 may display a sound setting interface.

Figure 6A:
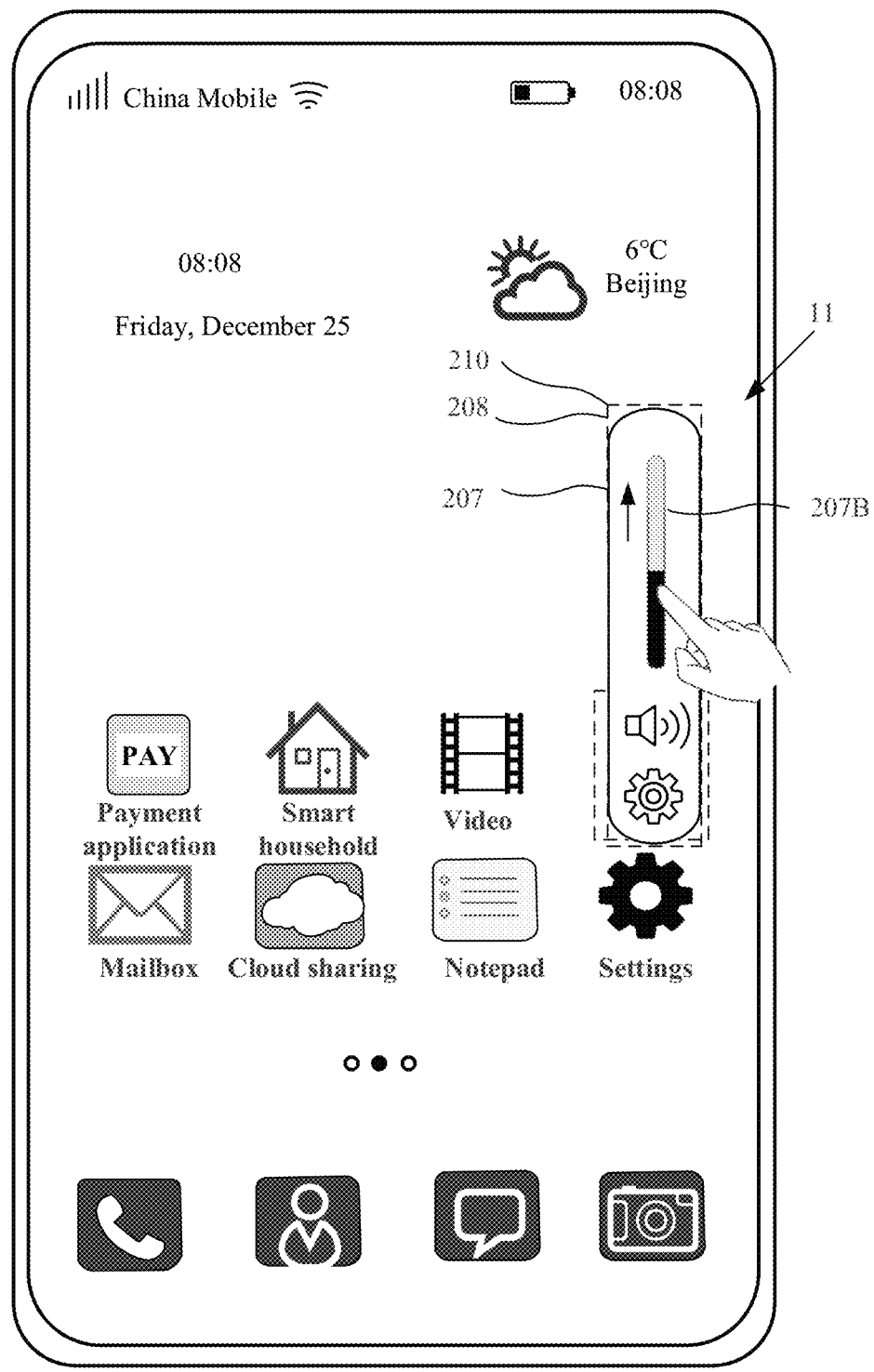
FIG. 6A to FIG. 6E are application scenarios of window display according to an embodiment of this application.

For example, as shown in FIG. 6A, the electronic device 100 responds to an upward sliding operation on the volume bar 207B, and the electronic device 100 may adjust the volume based on the length of the region 3 of the volume bar 207B, and adjust a display position and a size of display content 2 based on the display position and the size of the volume bar 207B. The display content 2 is all display content other than the volume bar 207B in the volume adjustment window 207 (i.e., the volume panel 207A, the speaker icon 207C, and the setting icon 207D).

Not limited to the foregoing upward sliding operation, the electronic device 100 responds to a press operation on the volume button. The electronic device may also adjust the length of the region 3 of the volume bar 207B, adjust the volume, and adjust the display position and the size of the display content 2 based on the display position and the size of the volume bar 207B.

Figure 6B:
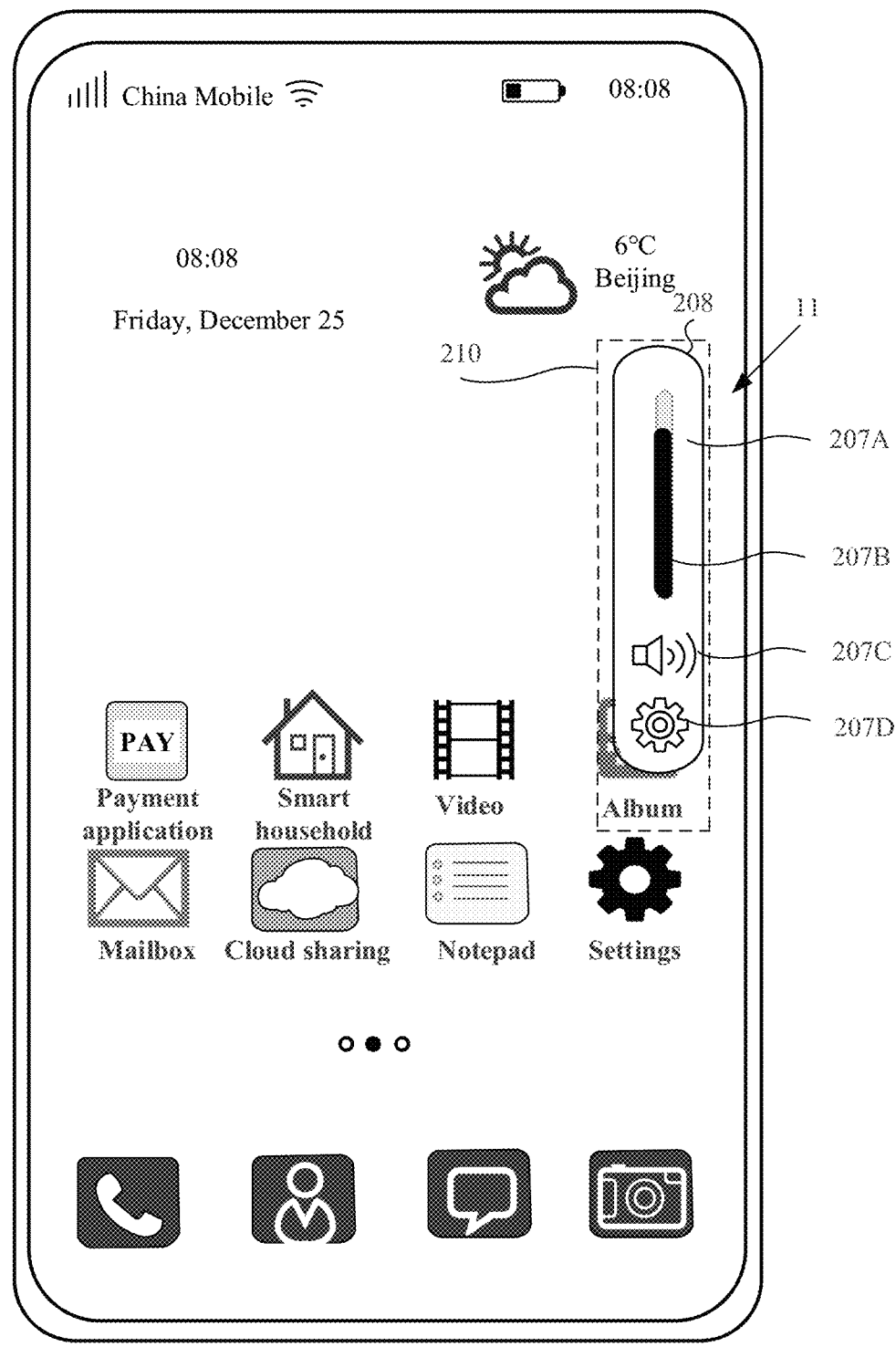

In some embodiments, in response to the foregoing upward sliding operation (or press operation), the volume adjustment window 207 shown in FIG. 6A is visually reduced to the volume adjustment window 207 shown in FIG. 6B after a display region of the display content 2 is reduced. Then, the electronic device 100 reduces the hot region of the window based on a display region of display content of a deformed volume adjustment window 207. In a window deformation process shown in FIG. 6A to FIG. 6B, the display position and the size of the volume bar 207B remain unchanged, the display content 2 is reduced, and the volume bar 207B does not completely cover the display content 2. That is, the display region of the display content 2 includes the display region of the volume bar 207B.

It should be noted that, a region occupied by the hot region 208 on the display screen 194 is determined based on a position and a size of the hot region 208, and reducing the hot region 208 includes adjusting the position and the size of the hot region 208. Controls in the display content 2 may be reduced by a same proportion, or may be reduced by a different proportion. This is not specifically limited herein.

Figure 6C:
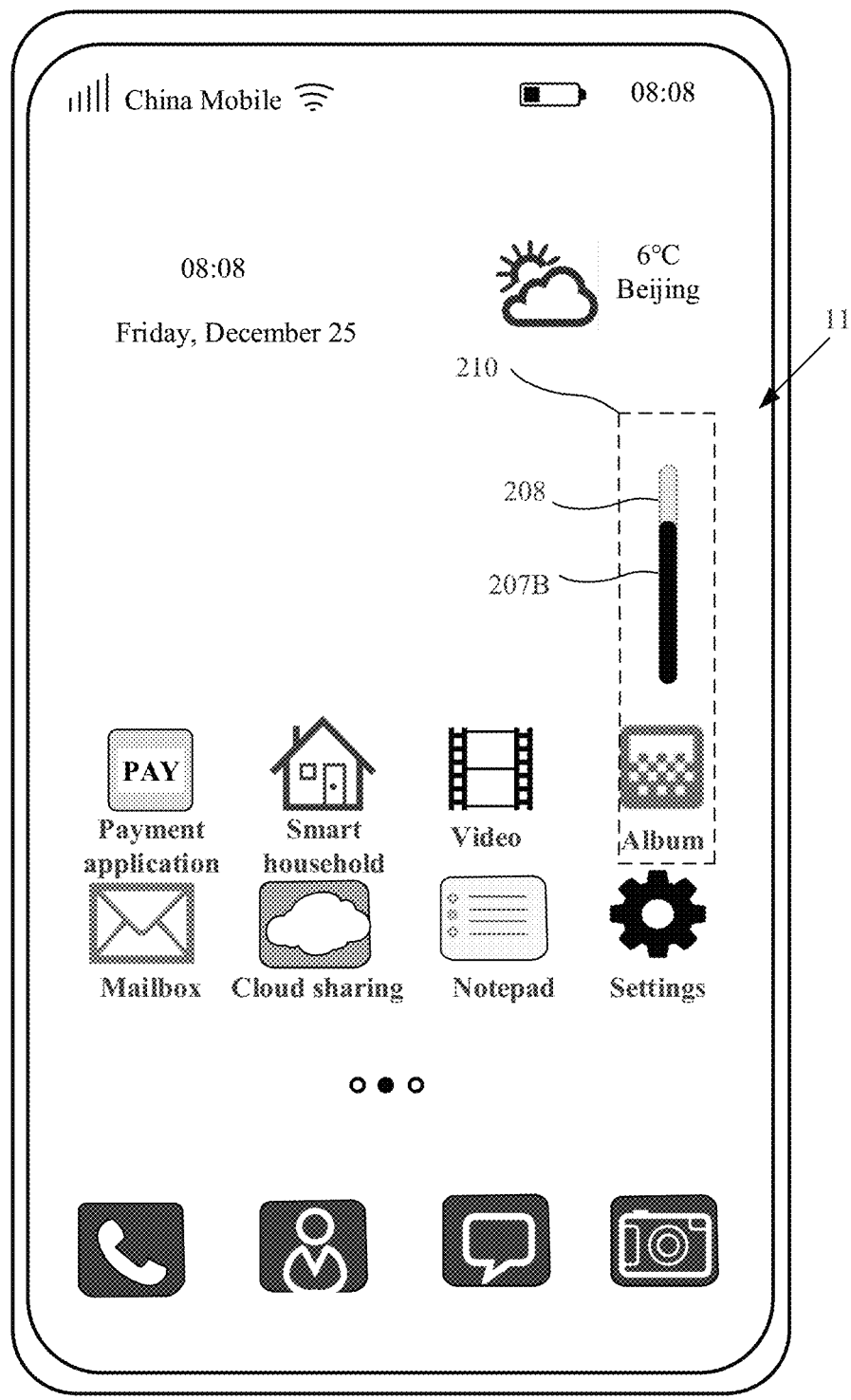

In an embodiment, in response to the upward sliding operation (or press operation), the volume adjustment window 207 shown in FIG. 6B continues to be visually reduced to the volume adjustment window 207 shown in FIG. 6C after the electronic device 100 displays the volume adjustment window 207 shown in FIG. 6B. In the window deformation process shown in FIG. 6B to FIG. 6C, the display position and the size of the volume bar 207B remain unchanged, and the display content 2 continues to be reduced until the volume bar 207B completely covers the display content 2. That is, the display region of the volume bar 207B includes the display region of the display content 2. In addition, the hot region 208 of the window continues to be reduced based on the display region of the display content of the deformed volume adjustment window 207.

In an embodiment, a size of the display region of the display content 2 of the volume adjustment window 207 in FIG. 6C may be reduced to zero.

In some embodiments, in a window deformation process in FIG. 6A to FIG. 6C, a display position of the volume bar 207B is moved to the right, a size of the volume bar 207B remains unchanged, and the size of the display content 2 is reduced based on the size of the volume bar 207B. The display position of the display content 2 is moved to the right based on the display position of the volume bar 207B. In some embodiments, after the user stops the upward sliding operation performed on the volume bar 207B, and the window deformation is completed, the electronic device 100 moves the volume adjustment window 207 to the right, so that the volume adjustment window 207 is close to an edge of the display screen 194.

Figure 6D:
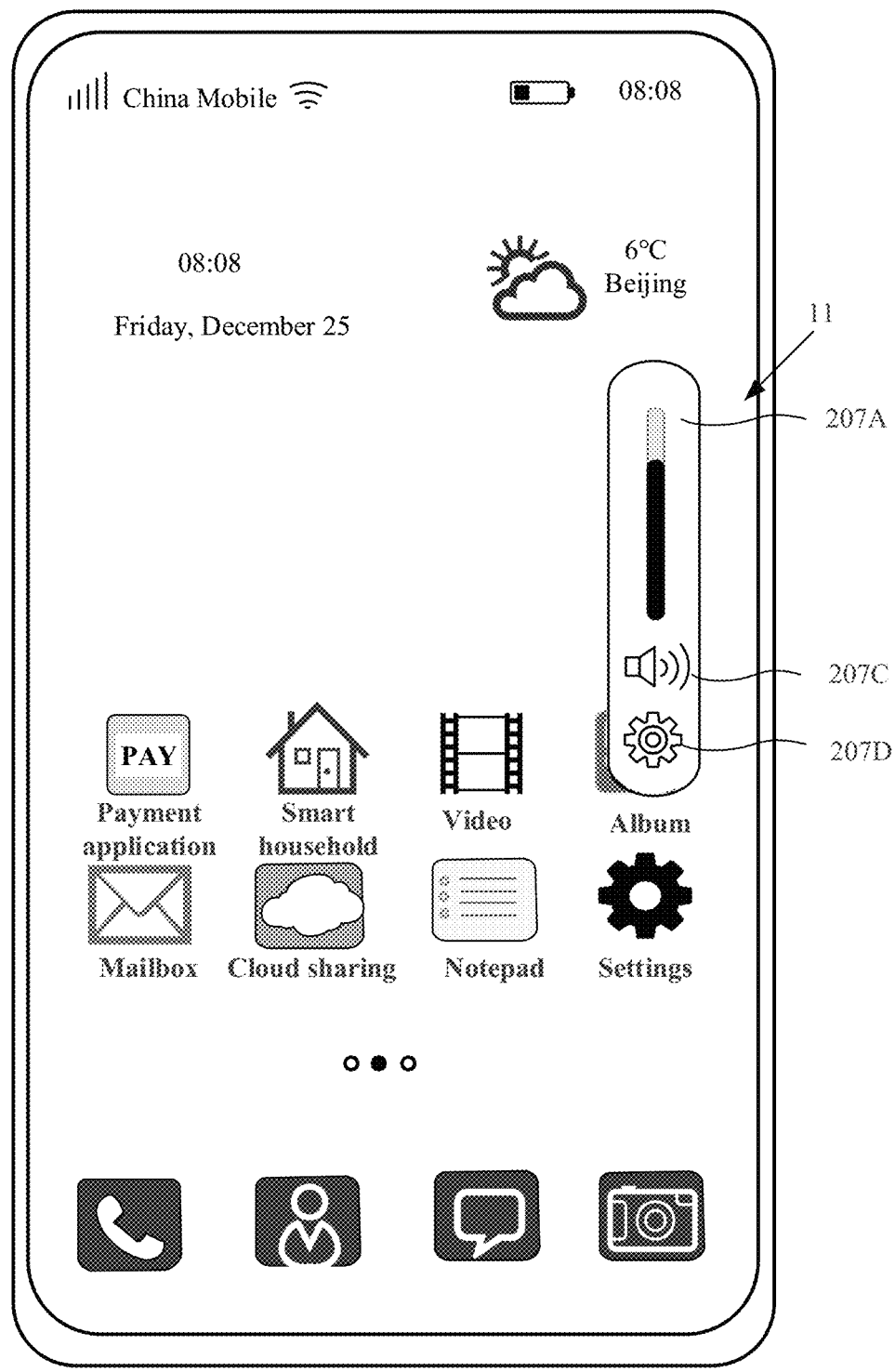

In an embodiment, as shown in FIG. 6D, in the window deformation process shown in FIG. 6A to FIG. 6B, controls other than the volume panel 207A in the display content 2 may gradually become transparent. Similarly, in the window deformation process shown in FIG. 6A to FIG. 6C, controls other than the volume panel 207A in the display content 2 may gradually become transparent.

Figure 6E:
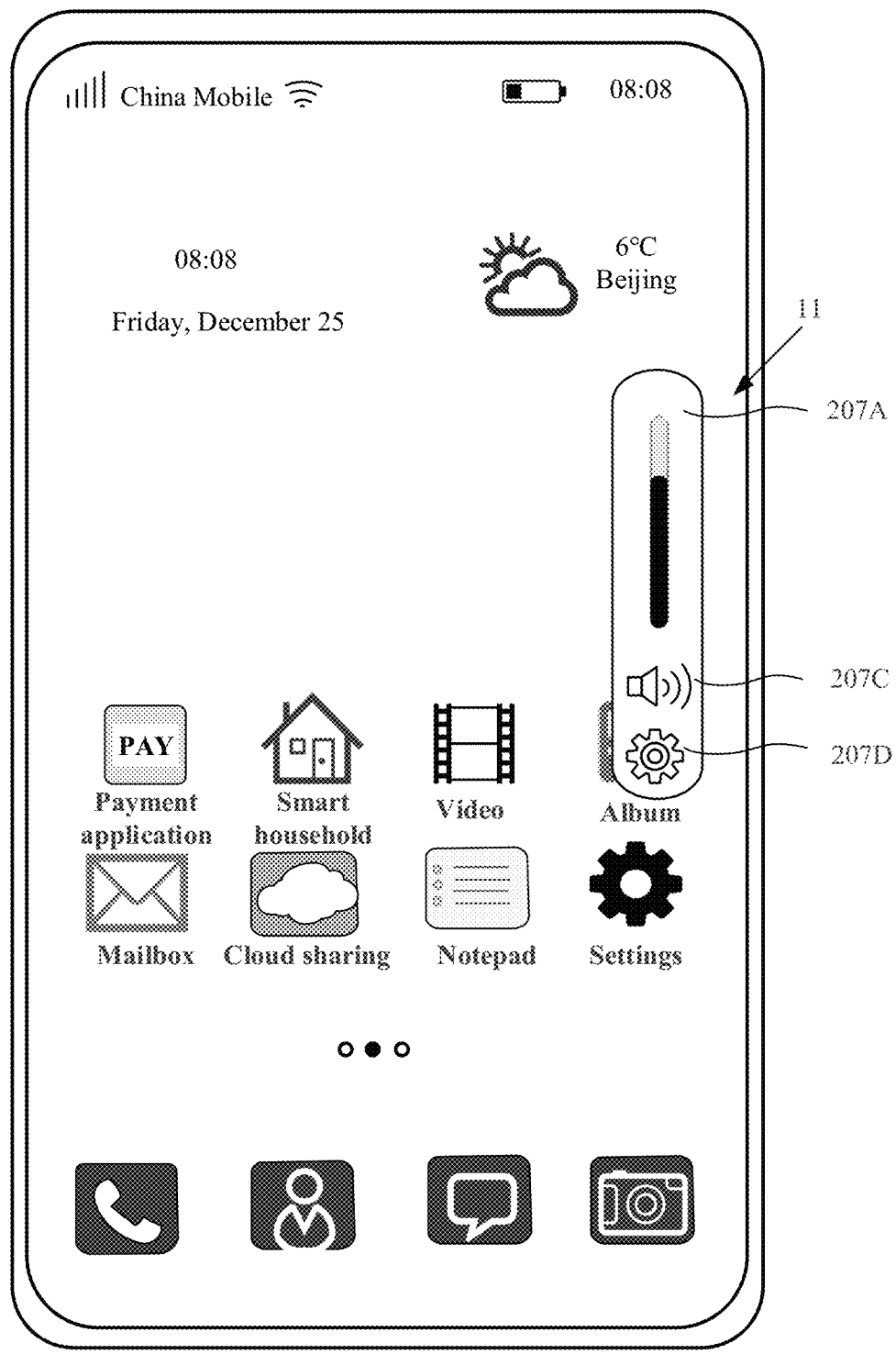

In an embodiment, as shown in FIG. 6E, in the window deformation process shown in FIG. 6A to FIG. 6B, all content of the display content 2 (i.e., the volume panel 207A, the speaker icon 207C, and the setting icon 207D) gradually becomes transparent. Similarly, in the window deformation process shown in FIG. 6A to FIG. 6C, all content of the display content 2 gradually becomes transparent.

In some embodiments, after the volume adjustment window 207 is deformed into the volume adjustment window 207 shown in FIG. 6B or FIG. 6C, when the electronic device 100 detects a touch operation performed on the volume bar 207B again, the electronic device 100 may restore an initial display state of the volume adjustment window 207. That is, the volume adjustment window 207 shown in FIG. 5 is displayed. In this way, when the user intends to manipulate other controls other than the volume bar 207B in the volume adjustment window, the user may restore the initial display state of the window by touching the volume adjustment window 207.

In an embodiment, in a process in which the volume adjustment window 207 shown in FIG. 6C (or FIG. 6B) is deformed into an initial display state of the window, the display content 2 is gradually enlarged. In an embodiment, transparency of the display content 2 in the volume adjustment window 207 shown in FIG. 6C (or FIG. 6B) is high. In a process in which the volume adjustment window 207 shown in FIG. 6C (or FIG. 6B) is deformed into the initial display state of the window, the transparency of the display content 2 is gradually reduced.

It should be noted that, in the window deformation process shown in FIG. 6A to FIG. 6C or FIG. 6C to FIG. 6A, the window is deformed in various manners. This is not limited in embodiments of this application.

In embodiments of this application, refer to the hot region 208 shown in FIG. 6B and FIG. 6C. In the window deformation process shown in FIG. 6A to FIG. 6C or FIG. 6C to FIG. 6A, the hot region 208 may change with the change of the display content 2 of the volume adjustment window 207.

The following further describes how to determine a hot region 208 of the deformed volume adjustment window 207.

In some embodiments, that the electronic device 100 reduces the hot region 208 of the window based on a display region of display content of a deformed volume adjustment window 207 further includes: The electronic device 100 reduces the hot region 208 of the window based on a display region of the display content 1 of the deformed window, where the reduced hot region 208 includes the display region of the display content 1.

In an embodiment, the electronic device 100 sets the reduced hot region 208 to be the same as the display region of the display content 1. For example, the deformed volume adjustment window 207 shown in FIG. 6B is used as an example. Because the display region of the panel 207A in the display content 1 includes a display region of another control in the display content 1. The reduced hot region 208 may be the same as the display region of the panel 207A. For example, the deformed volume adjustment window 207 shown in FIG. 6C is used as an example. Because the display region of the volume bar 207B in the display content 1 includes a display region of another control in the display content 1. The reduced hot region 208 may be the same as the display region of the volume bar 207B.

Figure 7A:
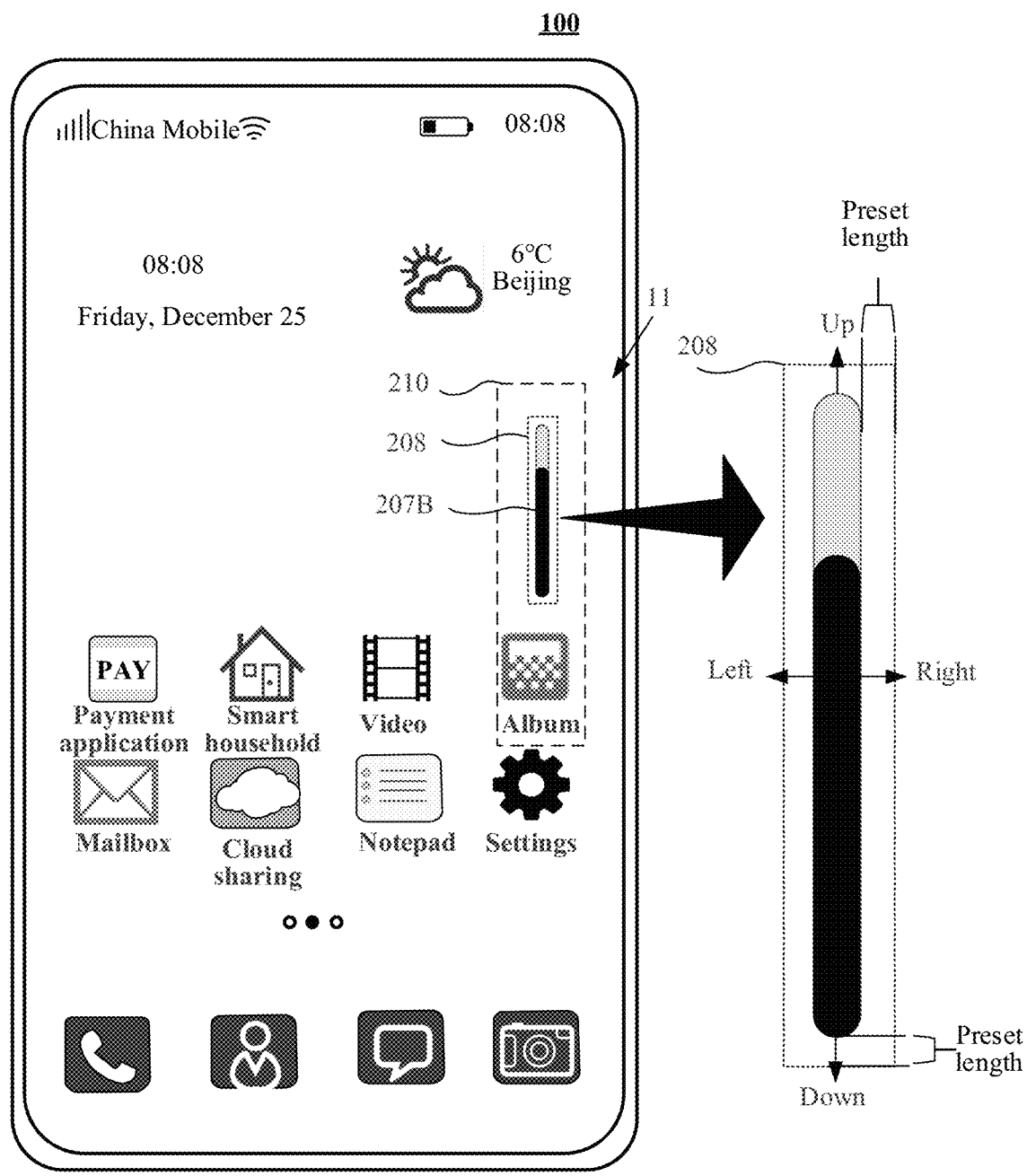
FIG. 7A to FIG. 7B are schematic diagrams of a group of window hot regions according to an embodiment of this application.

In an embodiment, the electronic device 100 sets the reduced hot region 208 to include the display region of the display content 1, and the size of the hot region 208 is greater than a size of the display region of the display content 1. Optionally, the hot region 208 is set to a rectangular region obtained after the display region of the display content 1 is enlarged by a preset proportion, or the hot region 208 is set to a rectangular region obtained through extending the display region of the display content 1 all around (upward, downward, leftward, and rightward) by a preset length. For example, the deformed volume adjustment window 207 shown in FIG. 7A is used as an example. The hot region 208 is a rectangular region obtained through extending the display region of the display content 1 all around by a preset length.

It should be noted that, the preset proportion is a ratio of the hot region 208 to an area of the display region of the display content 1. Alternatively, the preset proportion is a ratio of a width of the hot region 208 to a width of the display region of the display content 1, or a ratio of a height of the hot region 208 to a height of the display region of the display content 1. For example, the preset proportion may be 1.1, and the preset length may be a length of 10 pixels.

In some embodiments, in the window deformation process, when the area (or width or height) of the display region of the display content 1 is greater than a preset value 2, the hot region 208 is set to be the same as the display region of the display content 1. When the area (or width or height) of the display region of the display content 1 is less than or equal to the preset value 2, it is set that the size of the hot region 208 is greater than the size of the display region of the display content 1 and less than the size of the region 210 occupied by the window, and the hot region 208 includes the display region of the display content 1.

Figure 7B:
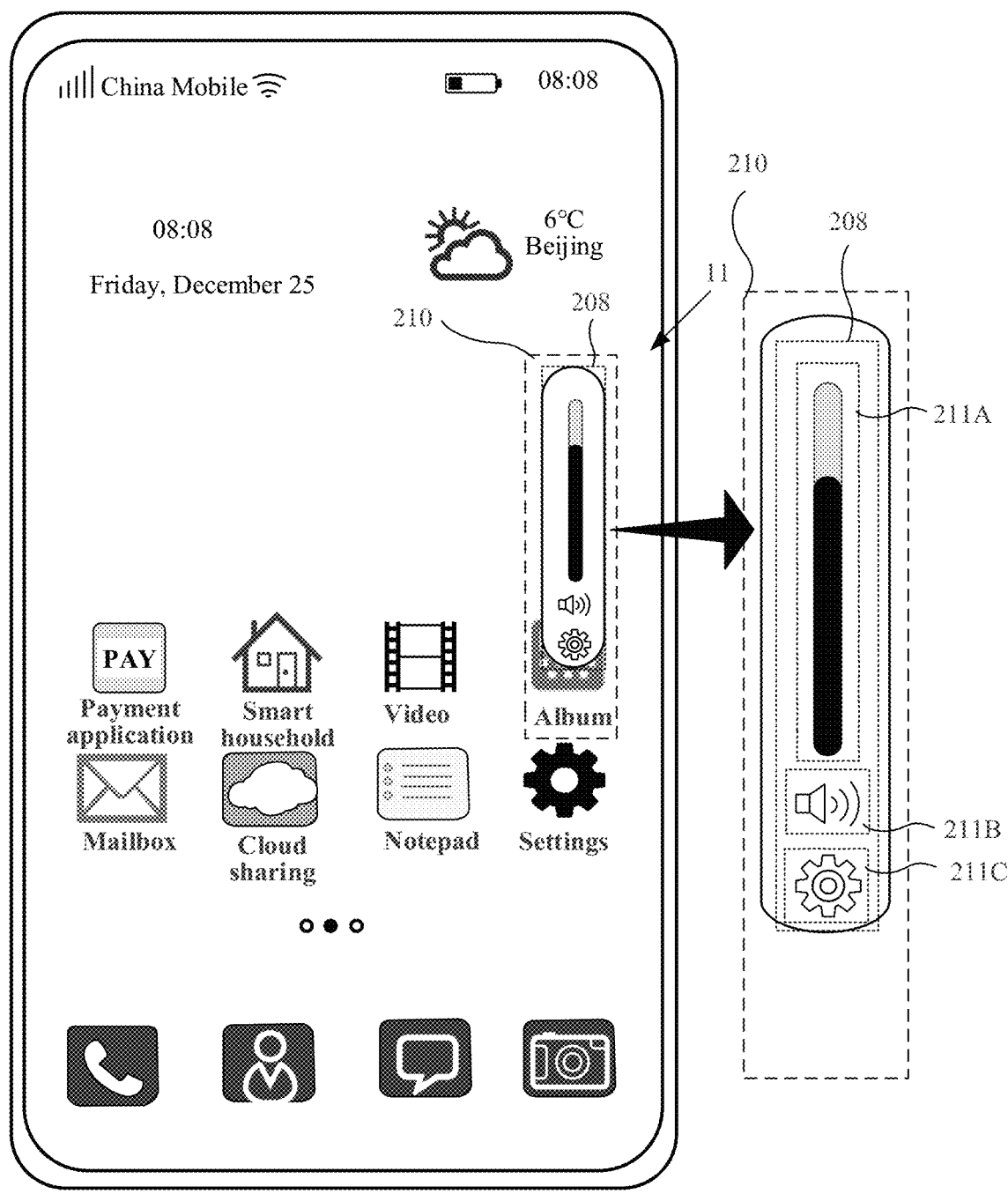

In some embodiments, that the electronic device 100 reduces the hot region 208 of the window based on a display region of display content of a deformed volume adjustment window 207 further includes: The electronic device 100 reduces the hot region of the window based on a display region of a response control in the display content 1 of the deformed window, where the reduced hot region 208 includes the display region of the response control in the display content 1. For example, the deformed volume adjustment window 207 shown in FIG. 7B is used as an example. The response control in the display content 1 includes the volume bar 207B, the speaker icon 207C, and the setting icon 207D. The reduced hot region 208 includes a display region 211A of the volume bar 207B, a display region 211B of the speaker icon 207C, and a display region 211C of the setting icon 207D.

In addition, it should be noted that, in a window deformation process shown in FIG. 6A to FIG. 6E, the region 210 occupied by the volume adjustment window 207 may remain unchanged, or may be reduced as the display content 1 is reduced. This is not specifically limited in embodiments of this application.

Figure 8A:
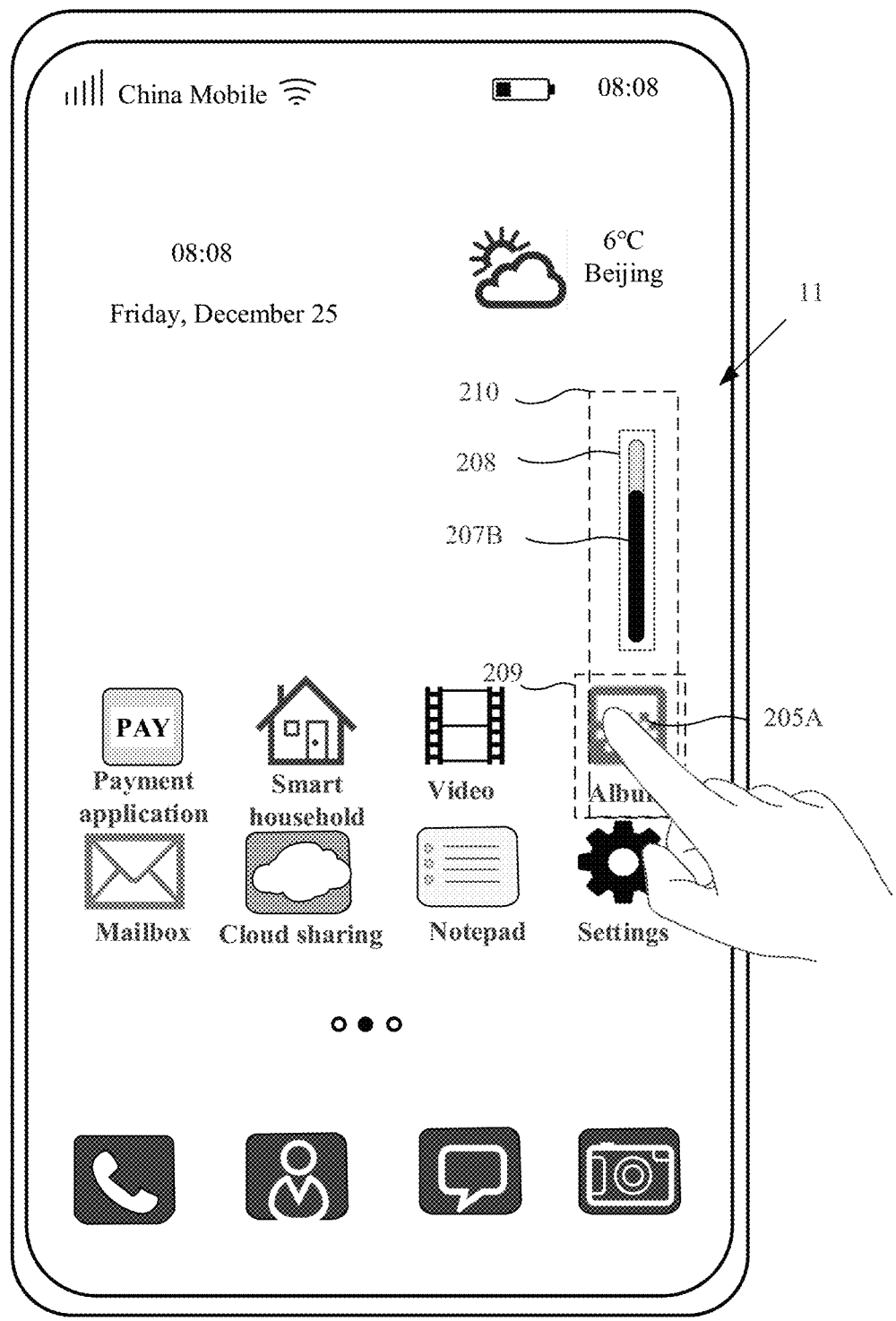
FIG. 8A to FIG. 8B are schematic diagrams of a group of interfaces according to an embodiment of this application.
Figure 8B:
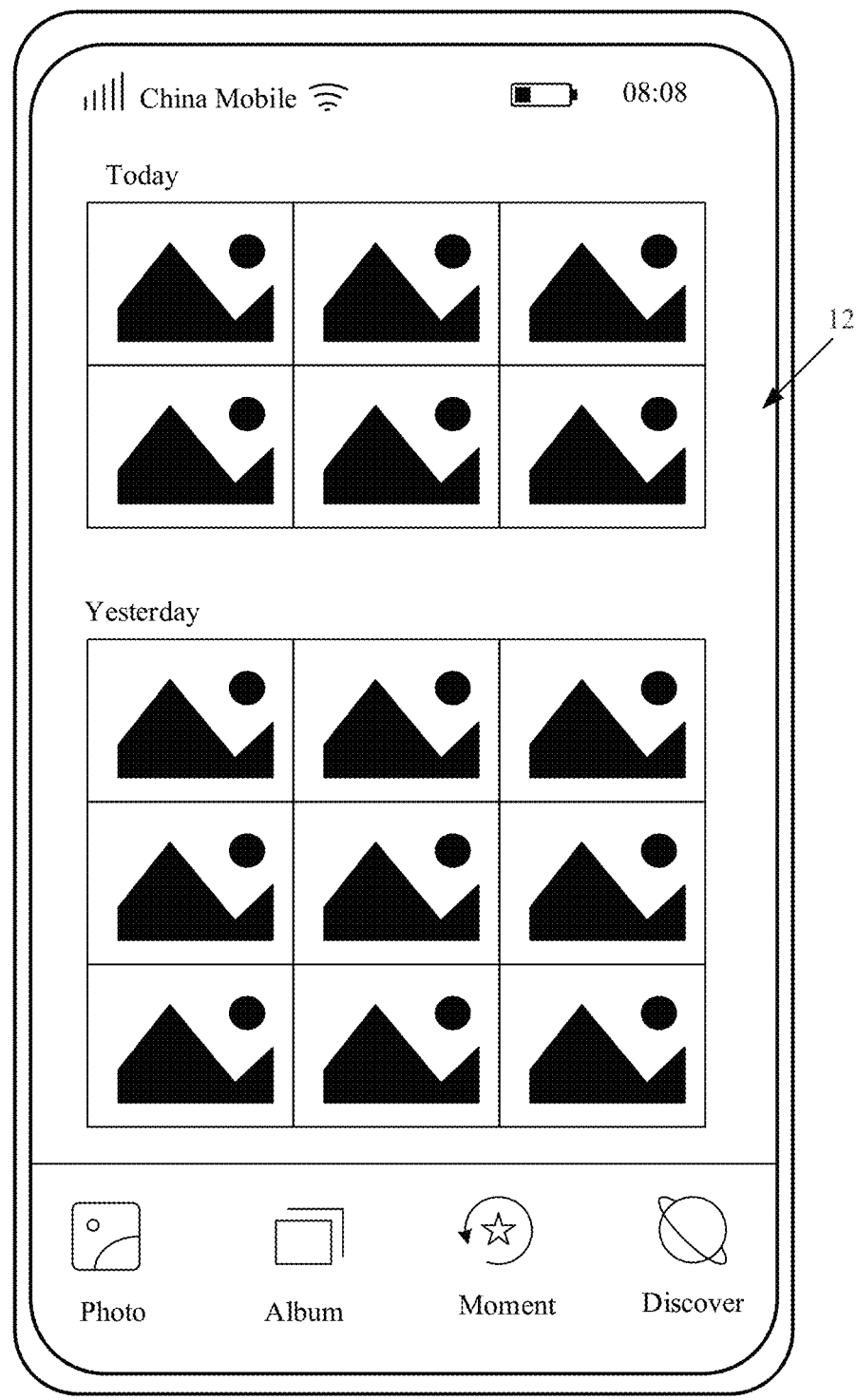

As shown in FIG. 8A, the volume adjustment window 207 shown in FIG. 6C is used as an example. After the window is deformed, only the volume bar 207B is displayed. The volume adjustment window 207 no longer blocks the album icon 205A, and the user may view the album icon 205A on the display screen 194. Correspondingly, the hot region 208 of the volume adjustment window 207 no longer covers the hot region 209 of the icon 205A. In this way, the album icon 205A may receive and respond to an input operation of the user.

For example, as shown in FIG. 8A, the electronic device 100 may detect an input operation (for example, a tap operation) performed on the album icon 205A. In response to the input operation, the electronic device 100 may display an album interface 12 shown in FIG. 8B. The album interface 12 is configured to display one or more photo lists. In this way, according to embodiments of this application, the electronic device 100 may reduce other display content in the volume adjustment window 207 based on the volume bar 207B that the user pays attention to, and reduce a hot region 208 corresponding to the window based on a display region of all content in the volume adjustment window 207. Therefore, an operable region for the user on the display screen 194 is increased, and screen utilization is improved.

Scenario 2

Figure 9A:
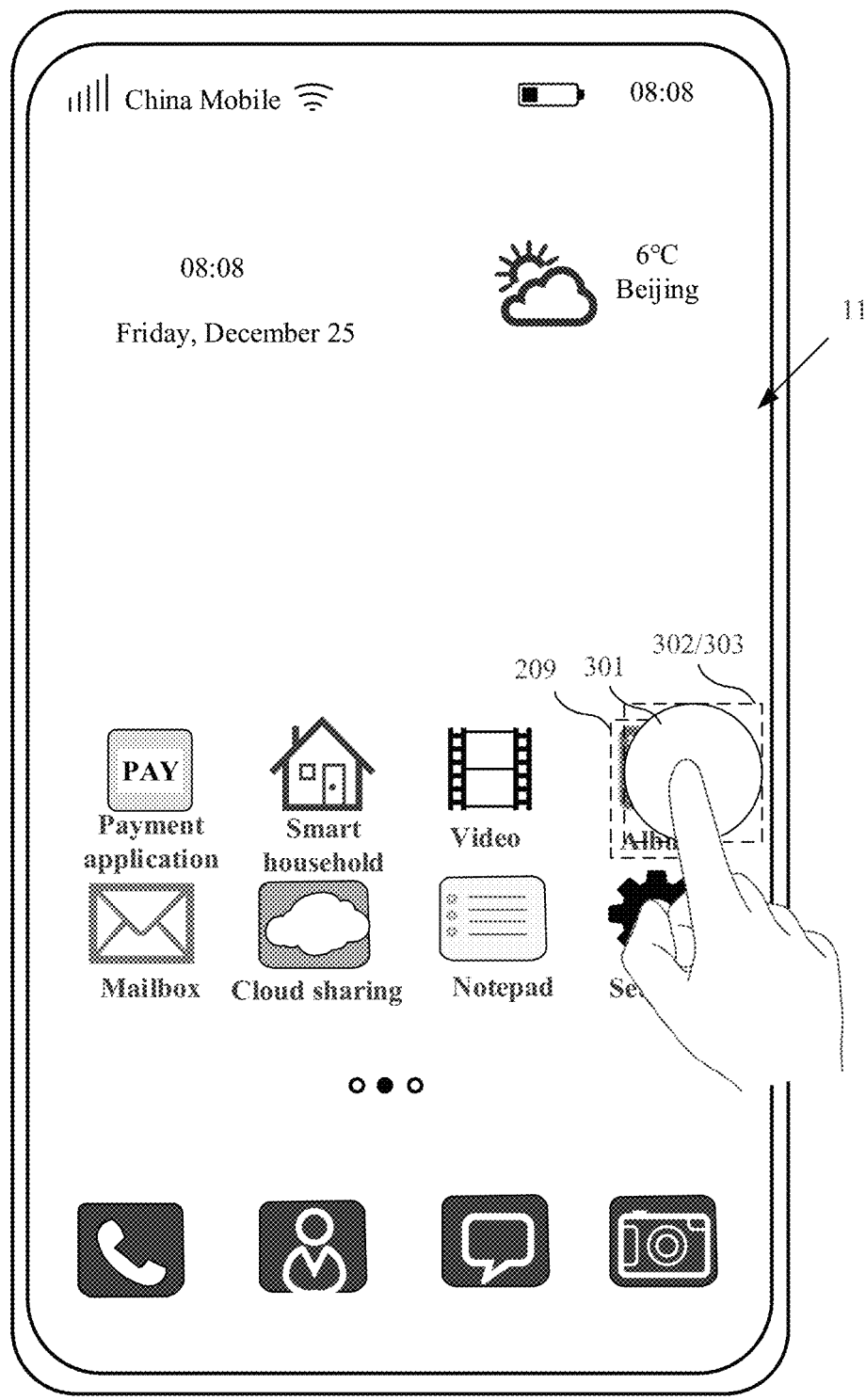
FIG. 9A to FIG. 9C are application scenarios of another window display according to an embodiment of this application.
Figure 9B:
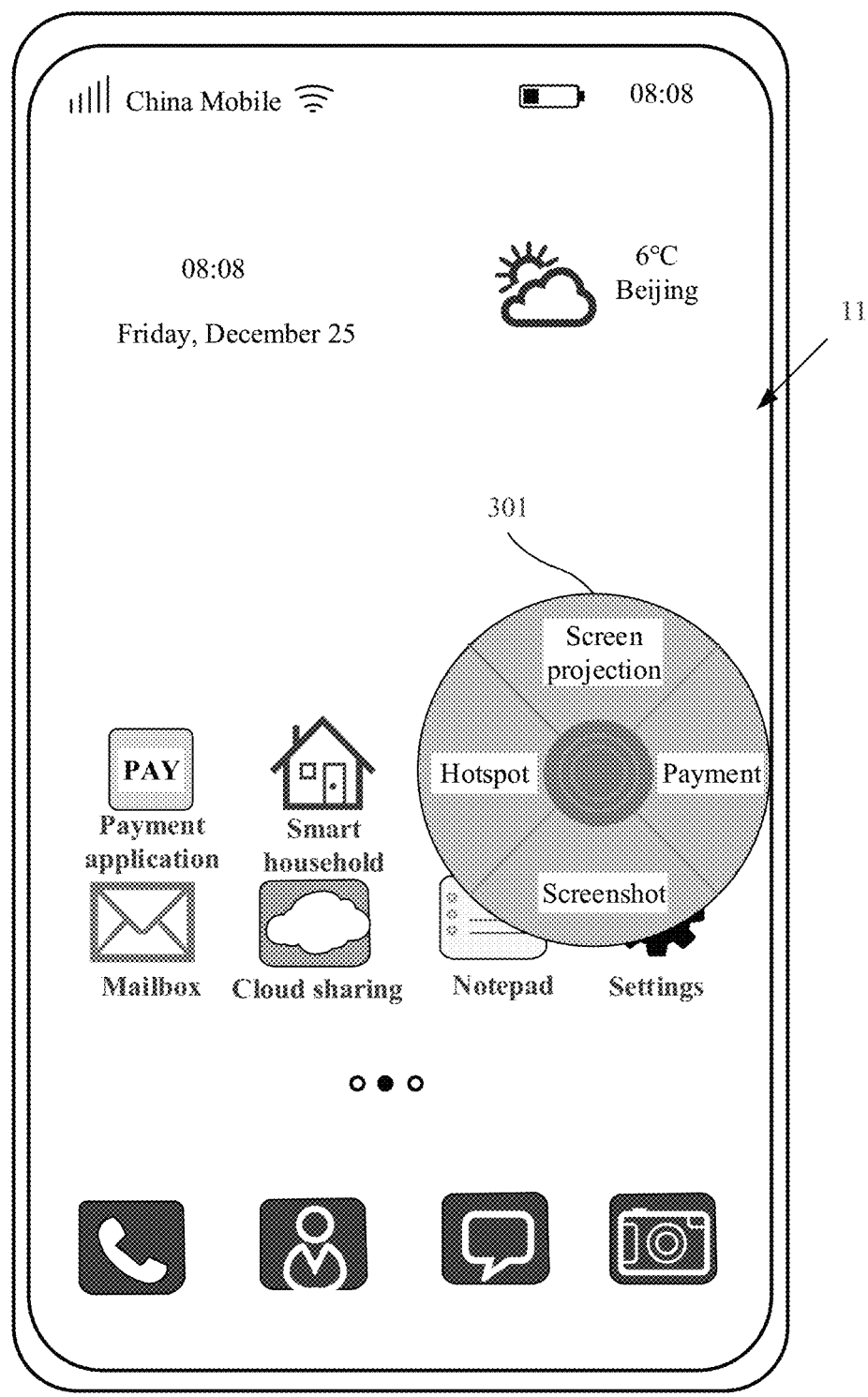
Figure 9C:
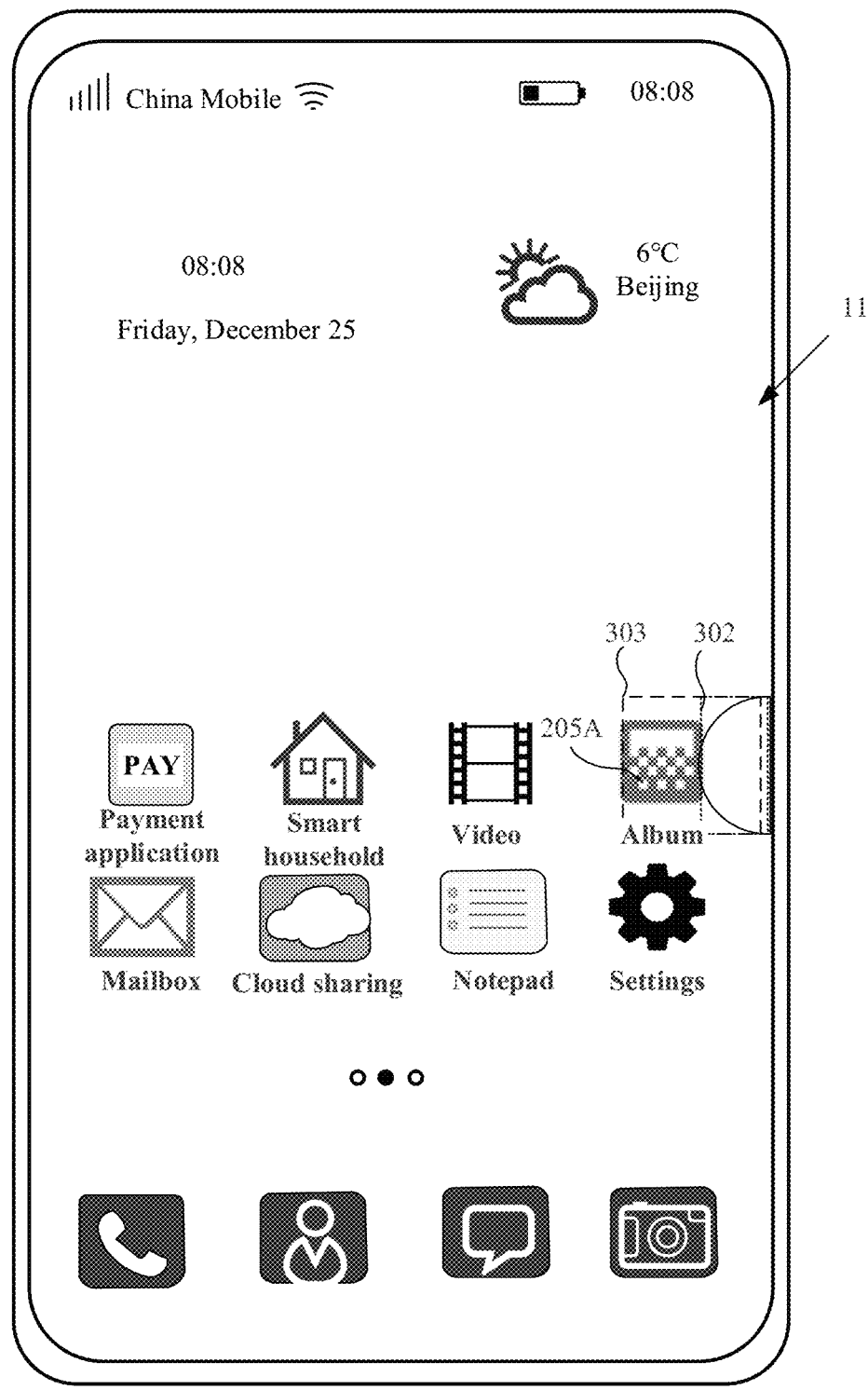

FIG. 9A to FIG. 9C illustratively show another application scenario of window display with a hot region reduced by using a floating ball window as an example.

For example, as shown in FIG. 9A, the electronic device 100 displays a floating ball window 301 on the user interface 11. As shown in FIG. 9A, display content of the floating ball window 301 covers the album icon 205A, and a hot region 302 of the floating ball window 301 covers the hot region 209 of the album icon 205A. Optionally, a hot region 208 of the floating ball window 301 shown in FIG. 9A is the same as a region 303 occupied by the floating ball window. The display content of the floating ball window 301 may be a floating ball shown in FIG. 9A, or may be a floating ball displayed in another form. This is not specifically limited herein.

In some embodiments, the floating ball window 301 is configured to clear a background application. In an embodiment, the floating ball window 301 may receive an input operation (for example, a long-press operation) of the user. In response to the input operation, the electronic device 100 clears running data of the background application. In another implementation, the floating ball window 301 may receive an input operation (for example, a long-press operation) of the user. In response to the input operation, the electronic device 100 displays an interface for clearing the background application. In addition, not limited to clearing the background application, the floating ball window 301 may be further configured to clear other data, for example, a memory of the electronic device 100. This is not specifically limited herein.

In some embodiments, the floating ball window 301 is configured to invoke a shortcut menu. For example, the floating ball window 301 receives an input operation (for example, a tap operation) of the user. In response to the input operation, the electronic device 100 displays a shortcut menu bar 303 shown in FIG. 9B.

In embodiments of this application, when no input operation performed on the floating ball window 301 is detected within preset duration, the electronic device 100 reduces the display content of the floating ball window 301, and reduces the hot region 302 of the floating ball window 301 based on the display content of the floating ball window 301. A floating ball of the floating ball window shown in FIG. 9A is deformed into a semicircular state shown in FIG. 9C, and is displayed on the edge of the display screen.

In an embodiment, for a deformed floating ball window 301 shown in FIG. 9C, the electronic device 100 sets a hot region 303 to be the same as a display region of the display content of the floating ball window 301. In an embodiment, the electronic device 100 sets a size of the hot region 303 to be greater than a size of the display region of the display content of the floating ball window 301, and less than the region 303 occupied by the floating ball window 301. The hot region 303 includes the display region of the display content of the floating ball window 301. In addition, for how to determine the hot region 302 of the floating ball window 301 based on the display content of the deformed floating ball window 301 shown in FIG. 9C, refer to the related embodiment of the volume adjustment window 207. Details are not described herein again.

After the floating ball window in FIG. 9A to FIG. 9C is deformed, the floating ball window 301 no longer completely blocks the album icon 205A, and the user may view the album icon 205A on the display screen 194. Correspondingly, the hot region 302 of the floating ball window 301 no longer covers the hot region 209 of the icon 205A. In this way, the album icon 205A may receive and respond to an input operation of the user.

In addition, refer to FIG. 9A to FIG. 9C. In a deformation process of the floating ball window 301, the region 303 occupied by the floating ball window 301 may remain unchanged, or may be reduced as the display content of the floating ball window 301 is reduced. Not limited to the volume adjustment window 207 and the floating ball window 301, an application scenario of reducing the window hot region provided in embodiments of this application may be further applied to another window. For example, a video call window, a small video viewing window of a video application, or the like, which is not specifically limited herein.

It should be noted that, in embodiments of this application, shapes of the control (for example, the volume bar 207B) and the window (e.g., the volume adjustment window 207 or the floating ball window 301) displayed on the display screen can be varied, however, the display regions of the control and the window are usually rectangular. In addition, the display region of the rectangle may be determined based on a display position (for example, a coordinate of an upper left point of the region) and a size (for example, a width and a height of the region) of the region. For example, an icon is displayed in a circular shape, and a display region of the icon may be an outer tangent rectangle of the circle.

Scenario 3

FIG. 10A to FIG. 10E illustratively show an application scenario of window display by using a call window as an example.

Figure 10A:
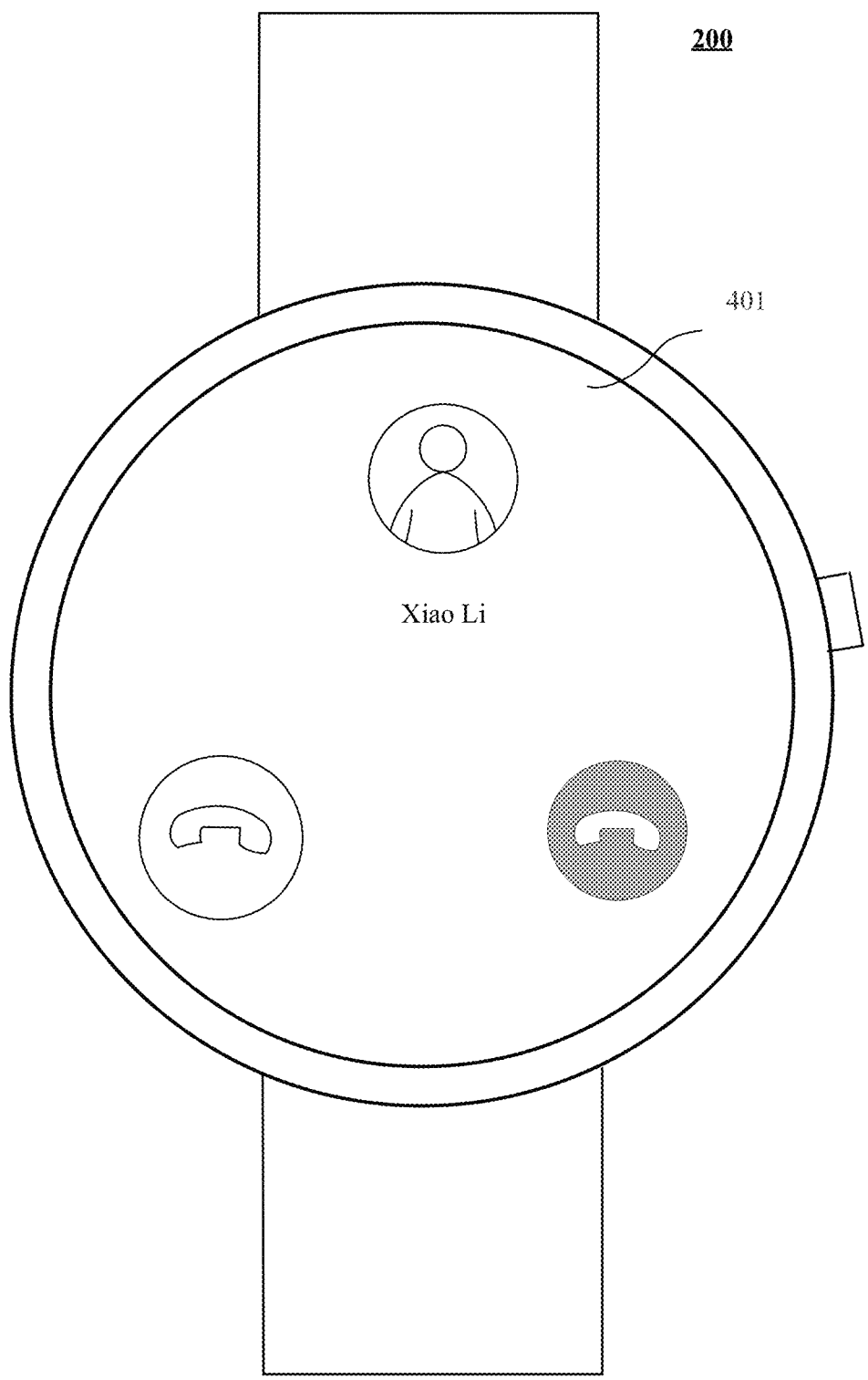
FIG. 10A to FIG. 10E are application scenarios of another window display according to an embodiment of this application.

For example, as shown in FIG. 10A, the electronic device 200 displays one call window 401 in full screen. In this case, a hot region 402 of the call window 401 and a region occupied by the call window 401 are the same. For example, the hot region 402 includes all display regions of the display screen. The electronic device 200 may detect an input operation performed on the full-screen call window 401. In response to the input operation, the electronic device 200 may reduce display content of the call window 401, and display the call window 401 obtained after the display content is reduced on a user interface 21 shown in FIG. 10B. In this way, the call window 401 is visually reduced.

It should be noted that, the user interface 21 may be a main interface of the electronic device 200, or may be another user interface of the electronic device 200.

Figure 10B:
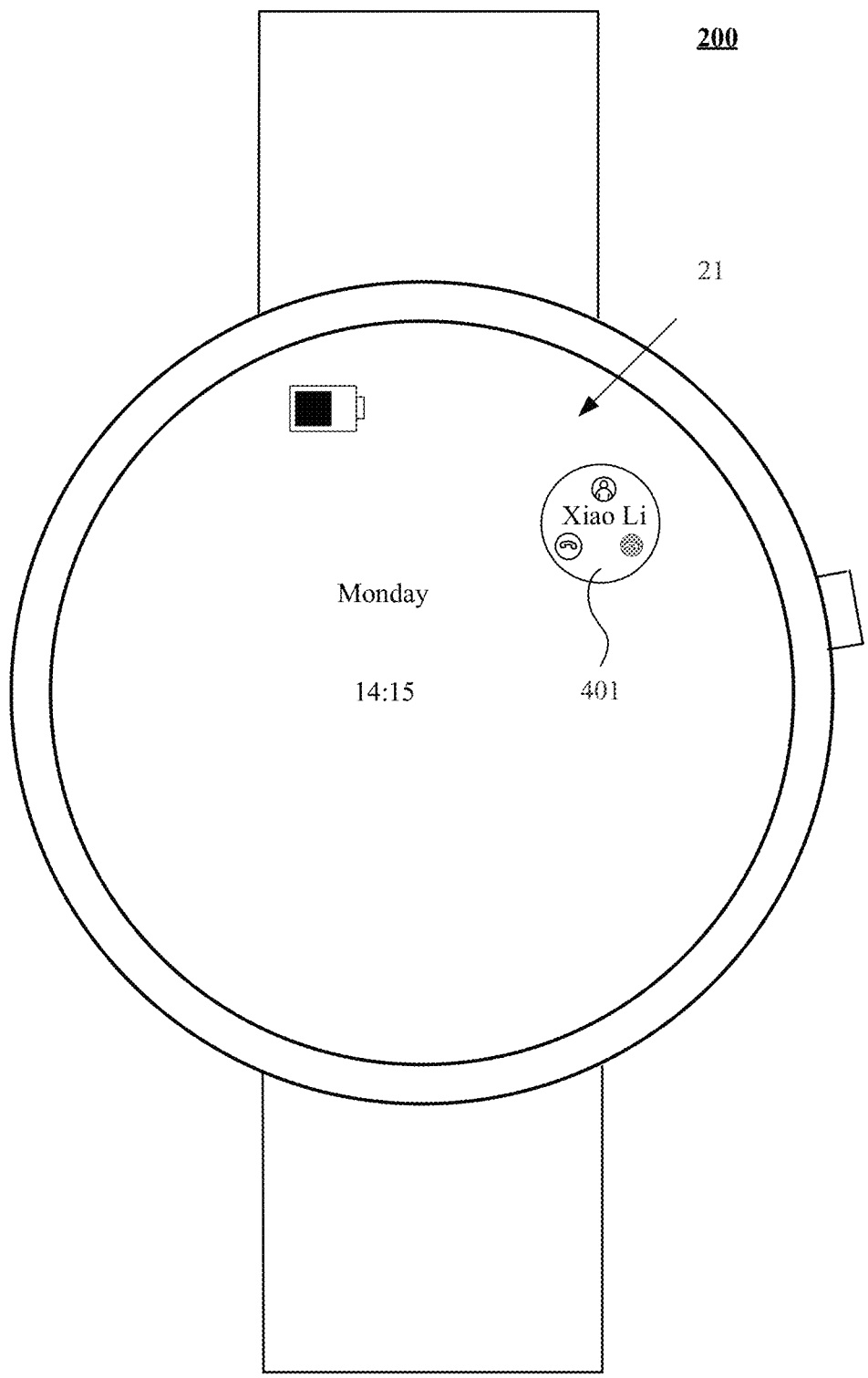

In another implementation, in a window deformation process shown in FIG. 10A to FIG. 10B, the region occupied by the call window 401 may remain unchanged. The hot region 402 of the call window 401 may remain unchanged, or may be reduced as the display content 1 of the call window 401 is reduced. After the call window 401 is deformed, the electronic device 100 determines the hot region 402 of the call window 401 based on a display region of the display content of the call window 401. A size of the hot region 402 is greater than the display region of the display content of the window. The hot region 402 includes the display region of the display content of the window.

Figure 10C:
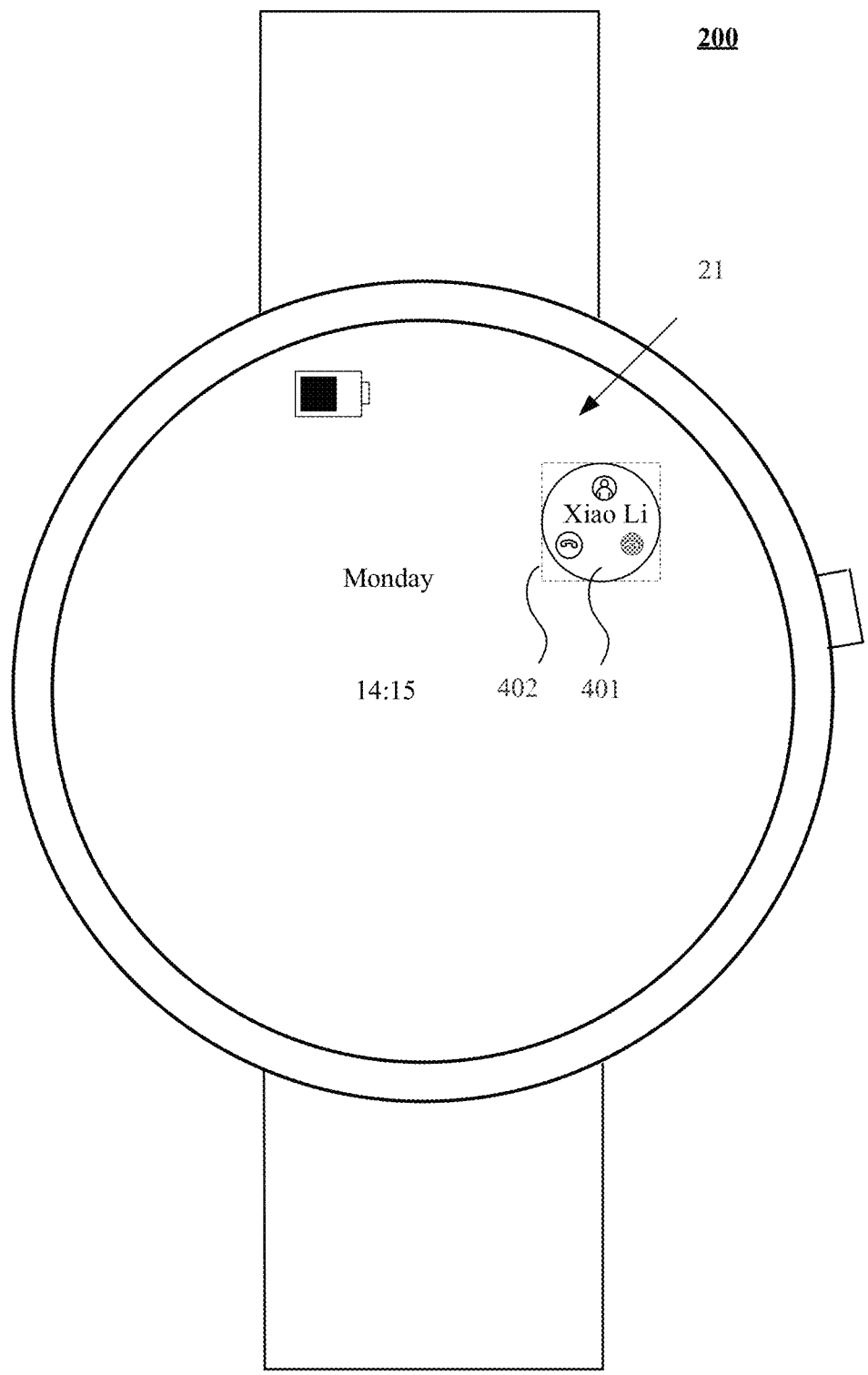

In an embodiment, in the window deformation process shown in FIG. 10A to FIG. 10B, the electronic device 200 synchronously reduces the region occupied by the call window 401 (for example, adjusting a first parameter of a small window 401). Further, the hot region of the call window 401 is synchronously reduced based on the region occupied by the call window 401. After the call window 401 is visually reduced to the small window shown in FIG. 10B, the hot region 402 of the window is appropriately expanded based on the display region of the display content of the window. For example, as shown in FIG. 10C, when the call window 401 is visually reduced to the small window, the hot region 402 is the same as the region occupied by the call window 401. Then, based on the display region of the display content of the window, the electronic device 100 appropriately expands the hot region of the window to be the hot region 402 shown in FIG. 10D.

In some embodiments, when an area of the display region of the display content of the call window 401 shown in FIG. 10B is greater than a preset value 1, the electronic device 100 determines the size of the hot region 402 based on the region occupied by the window. When the area of the display region of the display content of the call window 401 shown in FIG. 10B is less than the preset value 1, the electronic device 200 may determine the hot region 402 of the window based on the display region of the display content, so that the size of the hot region 402 is greater than the display region of the display content.

In an embodiment, the hot region 402 of the deformed window is set to be a region formed after the display region of the display content of the call window 401 is expanded based on a preset proportion. In another implementation, the hot region 402 of the deformed window is set to be a region formed after the display region of the display content of the call window 401 is extended around by a preset length. For the preset proportion and the preset length, refer to the related description in the foregoing embodiment. Details are not described herein again.

Figure 10D:
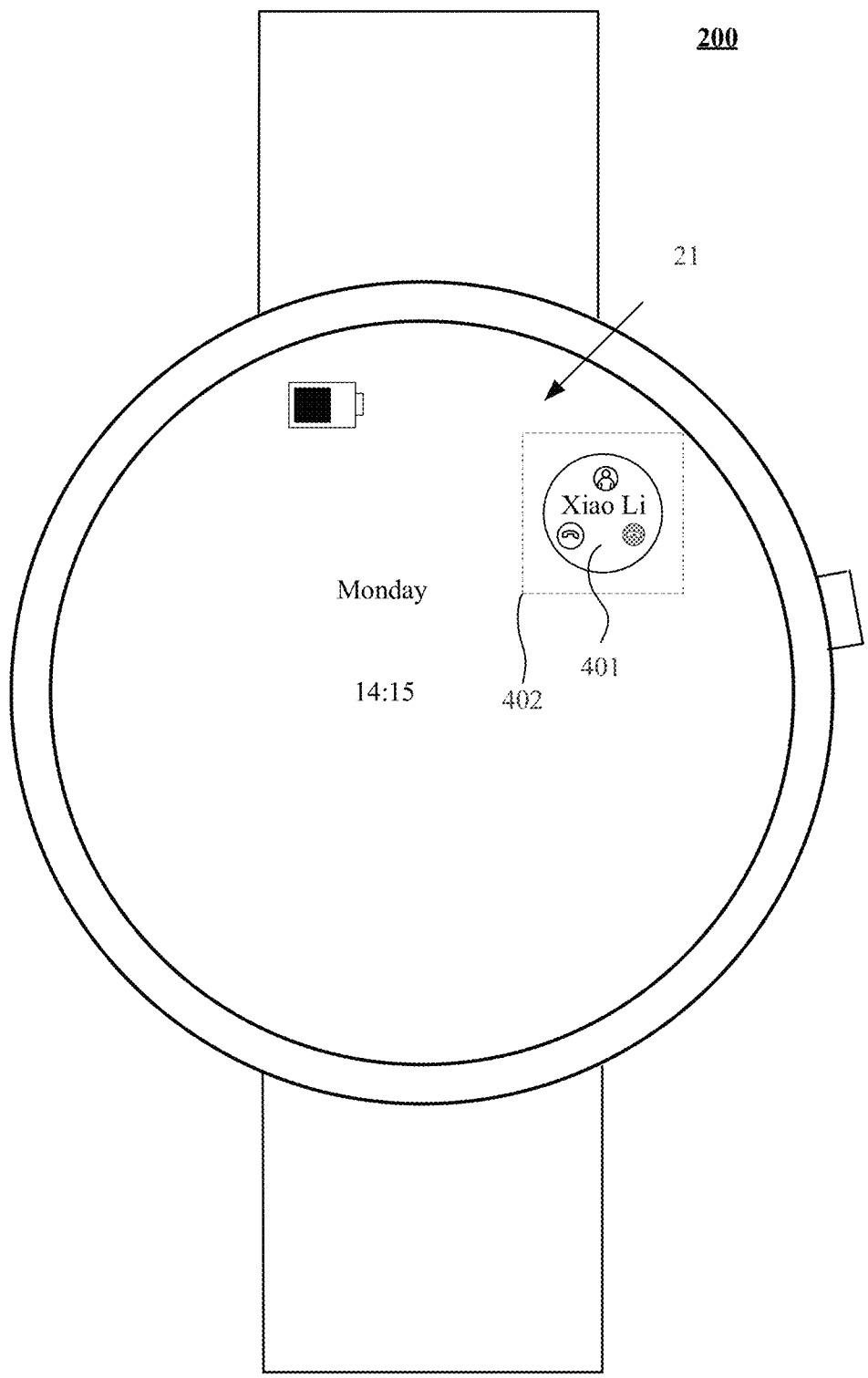
Figure 10E:
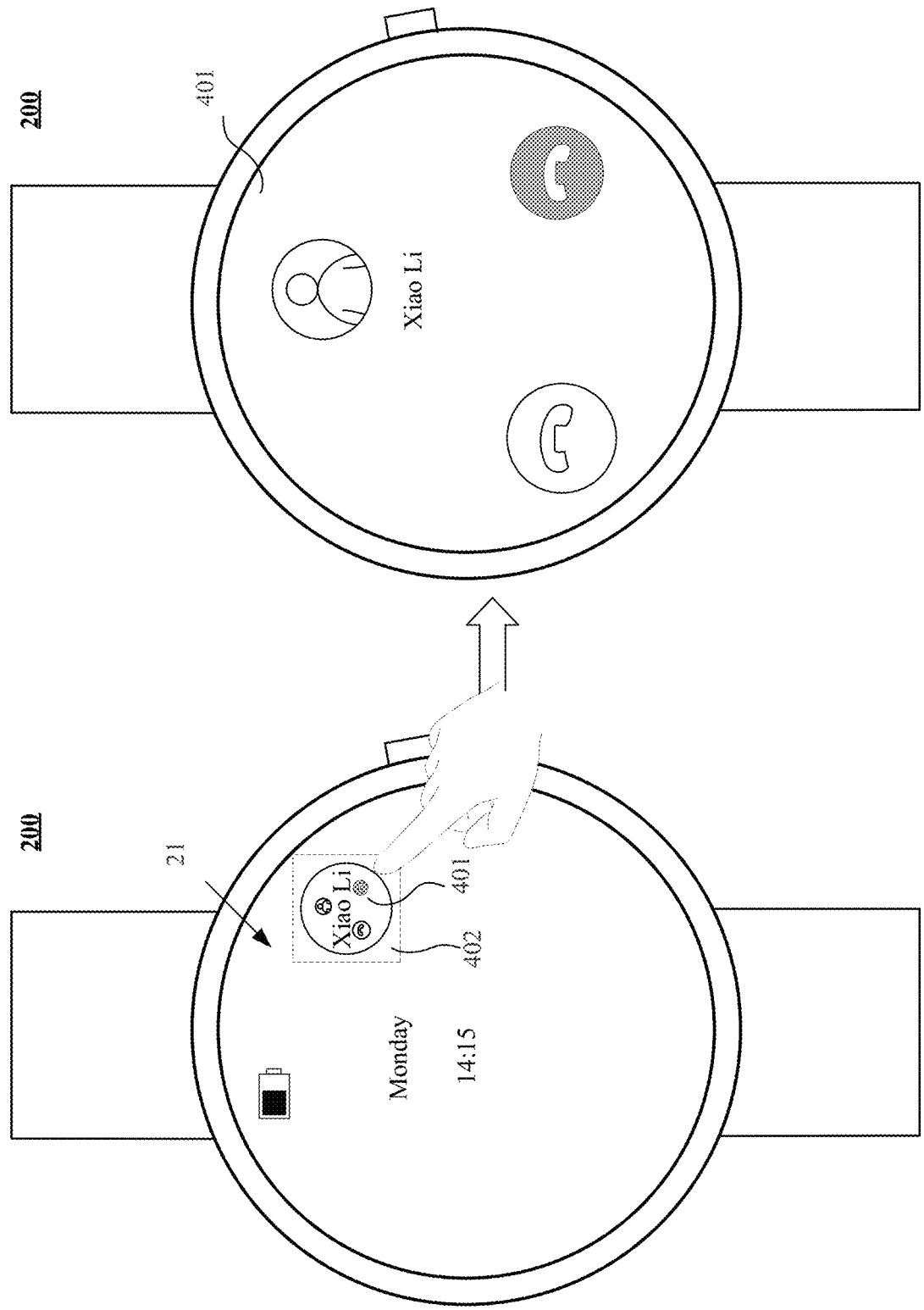

For example, as shown in FIG. 10E, the electronic device 200 may detect an input operation performed on the hot region 402 (e.g., a tap operation performed inside the hot region 402 and outside the call window 401). In response to the operation, the electronic device 200 displays a full-screen call interface 20 shown in FIG. 10A. In this way, according to embodiments of this application, after the full-screen call window 401 is visually deformed into a reduced call window 401, the electronic device 200 may properly enlarge the hot region 402 of the window based on a display region of reduced display content of the call window 401. This avoids a problem that the user cannot accurately operate the call window 401 because the display content of the window is too small, and ensures that no operation difficulty exists when the user restores the full-screen call window 401.

In addition, this is not limited to the call window. The application scenario of expanding a window hot region provided in embodiments of this application is further applicable to another window. For example, a small video viewing window of a video application. This is not specifically limited herein.

The following describes an animation implementation principle of window deformation provided in embodiments of this application.

In embodiments of this application, the electronic device 100 or the electronic device 200 may display a window deformation process using a window animation, a View (view) animation, and/or a layout animation. In an embodiment, the electronic device 100 or the electronic device 200 may display a window deformation process using a View animation and a layout animation, to improve smoothness of window deformation.

Figure 11:
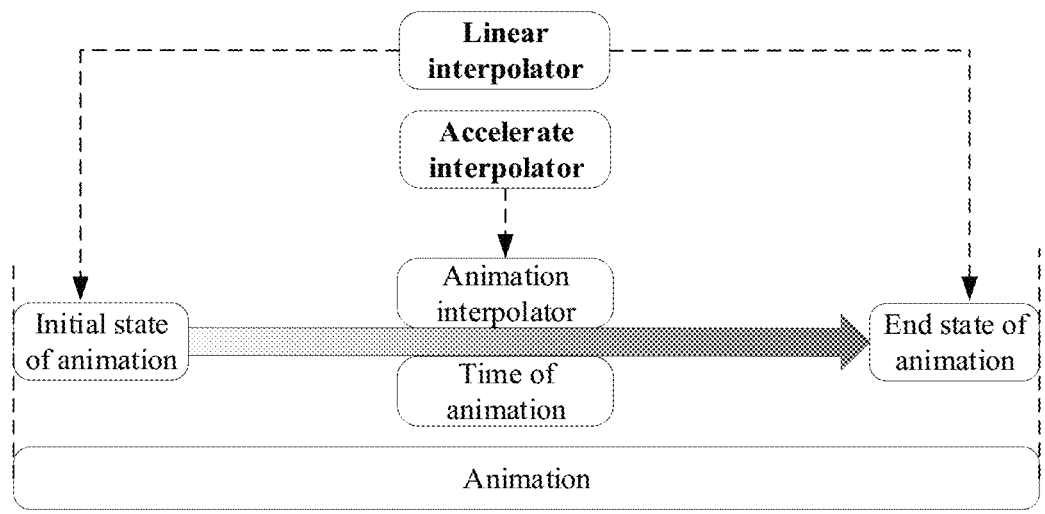
FIG. 11 is a schematic diagram of an animation implementation according to an embodiment of this application.

For example, FIG. 11 is a schematic diagram of an animation implementation according to an embodiment of this application. As shown in FIG. 11, elements for implementing animation include an initial state of animation, a final state of animation, animation duration, and an interpolator of animation. The interpolator is configured to set change logic of transitioning an animation attribute value from an initial state to a final state, to control a change rate of the animation, so that the animation effect can change at one or more of rates such as a constant speed, acceleration, deceleration, and a parabolic rate, and change in one or more of variation styles such as translation, scaling, rotation, and transparency. In embodiments of this application, the electronic device 100 may implement window deformation animation using a linear interpolator (an animation speed is kept at a constant speed).

In some embodiments of this application, the user may independently set the animation duration and the final state of the animation, and set the change logic of the animation attribute value by a system interpolator (for example, the linear interpolator or an accelerate interpolator) or a custom interpolator. When the animation is running, and when the electronic device 100 determines that the animation attribute value changes based on the change logic, the electronic device draws a frame image based on the animation attribute value, and refreshes the display window.

For example, the initial state of the animation is the volume adjustment window 207 shown in FIG. 6A, and the final state of the animation is the volume adjustment window 207 shown in FIG. 6C. The electronic device 100 sets animation duration 1 and an interpolator 1 of the animation, so that the volume adjustment window 207 is deformed from the volume adjustment window 207 shown in FIG. 6A to the volume adjustment window 207 shown in FIG. 6C based on the change logic set by the interpolator 1 in the animation duration 1. For example, the initial state of the animation is the full-screen call window 401 shown in FIG. 10A, and the final state of the animation is the visually reduced call window 401 shown in FIG. 10C. The electronic device 100 sets animation duration 2 and an interpolator 2 of the animation, so that the call window 401 is deformed from the full-screen call window 401 shown in FIG. 10A to the reduced call window 401 shown in FIG. 10C based on the change logic set by the interpolator 2 in the animation duration 2.

Embodiments of this application provide a window display method, so that a hot region of the window can be adjusted based on a display region of display content of the deformed window. In this way, when the electronic device 100 reduces the display content of the window, an operable region for the user on the display screen can be increased, thereby effectively improving screen utilization. In addition, the electronic device 100 may implement the window deformation process based on the View animation, thereby effectively improving window deformation smoothness.

Figure 12:
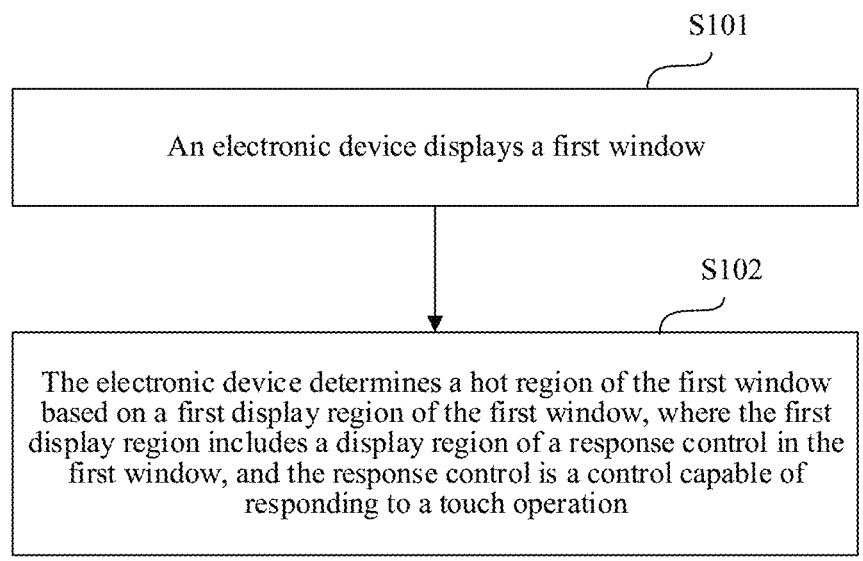
FIG. 12 is a schematic flowchart of a window display method according to an embodiment of this application.

FIG. 12 illustratively shows a window display method according to an embodiment of this application. The window display method includes but is not limited to steps S101 and S102.

S101. An electronic device displays a first window.

S102. The electronic device determines a hot region of the first window based on a first display region of the first window. The first display region includes a display region of a response control in the first window, and the response control is a control capable of responding to a touch operation.

An electronic device 100 may be the foregoing electronic device 100, or may be the foregoing electronic device 200.

For example, the foregoing first window may be the volume adjustment window 207 described in the foregoing scenario 1, or may be the floating ball window 301 described in the foregoing scenario 2, or may be the call window 401 described in the foregoing scenario 3. Not limited to the foregoing window, the window display method provided in embodiments of this application is further applicable to another type of window, for example, a video playback window.

In some embodiments, that the electronic device determines a hot region of the first window based on a first display region of the first window further includes: The electronic device reduces first display content of the first window when the first window meets a preset condition. That the electronic device determines a hot region of the first window based on a first display region of the first window further includes: The electronic device reduces the hot region of the first window to a first hot region based on the first display region. The first display region includes the display region of the response control in the first window in which the first display content is reduced. According to embodiments of this application, when the display content of the first window is reduced, the electronic device reduces the hot region of the first window based on a display region of the reduced display content, thereby adaptively increasing an operable region for a user on a display screen, and improving screen utilization.

In some embodiments, the first window includes a first control, the preset condition is that a first operation performed on the first control in the first window is detected, and the first display content includes display content other than the first control in the first window. According to embodiments of this application, after determining a control that the user is concerned about in the first window, the electronic device may reduce other display content that the user is not concerned about in the first window based on a display region of the control, and may further reduce the hot region of the first window based on a display region of the reduced display content, to increase the operable region for the user on the display screen and improve the screen utilization.

In some embodiments, the foregoing method further includes: The electronic device further performs a response event corresponding to the first operation in response to the first operation.

It should be noted that, the foregoing first operation may be directly performed on the first control by touching a hot region of the first control on the display screen, or may be indirectly performed on the first control in another manner. For example, the first control is the volume bar 207B, and the user indirectly acts on the volume bar 207B by the volume button. It may be understood that in embodiments of this application, if the response event corresponding to the first operation is the same as a response event for controlling the first control by directly using a touch operation, the first operation may be referred to as acting on the first control.

For example, refer to the related embodiment of the foregoing scenario 1. The first window may be the volume adjustment window 207 shown in FIG. 6A. Response controls in the volume adjustment window 207 include the volume bar 207B, the speaker icon 207C, and the setting icon 207D. In embodiments of this application, the electronic device 100 may determine the hot region of the volume adjustment window 207 based on the first display region of the volume adjustment window 207. The first display region includes the display regions of the volume bar 207B, the speaker icon 207C, and the setting icon 207D.

The first control may be the volume bar 207B in the volume adjustment window 207. The hot region of the first window is a hot region 208, and the first display content may include the display content other than the volume bar 207B in the volume adjustment window 207. For example, the first display content is the foregoing display content 2 (i.e., the volume panel 207A, the speaker icon 207C, and the setting icon 207D). The preset condition may be that a first operation performed on the volume bar 207B is detected. The first operation may be an upward sliding operation performed on the volume bar 207B shown in FIG. 6A, or may be a press operation that is implemented on the volume button and that is performed on the volume bar 207B. In response to the foregoing upward sliding operation, the electronic device 100 may reduce the display content 2 based on the position of the volume bar 207B, and reduce the hot region of the volume adjustment window 207 to the first hot region based on the first display region after the display content 2 is reduced. For example, after the display content 2 is reduced, the volume adjustment window 207 is deformed into the volume adjustment window 207 shown in FIG. 6B, and the first hot region may be the hot region 208 shown in FIG. 6B and FIG. 7B. After the display content 2 is reduced, the volume adjustment window 207 is deformed into the volume adjustment window 207 shown in FIG. 6C, and the first hot region may be the hot region 208 shown in FIG. 6C and FIG. 7A.

In addition, in response to the upward sliding operation or the press operation, the electronic device 100 further performs a response event corresponding to the volume bar 207B, that is, adjusts a length of the region 3 of the volume bar 207B, and adjusts a volume based on the length of the region 3.

In some embodiments, the preset condition is that no input operation performed on the first window is detected within preset duration. According to embodiments of this application, when the user does not pay attention to the first window for a long time, the display content of the first window may be reduced, and the hot region of the first window may be reduced based on the display region of the reduced display content, to increase the operable region for the user on the display screen and improve the screen utilization.

In some embodiments, the first window is a floating ball window, and the first display content is a floating ball in the floating ball window. For example, the preset duration is 3 seconds.

For example, refer to the related embodiment of the foregoing scenario 2. The first window may be the floating ball window 301 shown in FIG. 9A. The first display content may be a floating ball displayed in the floating ball window 301. The floating ball after being reduced is displayed in the semicircular state shown in FIG. 9C. The electronic device 100 reduces a hot region of the floating ball window 301 to a first hot region based on the first display region of the floating ball window 301 shown in FIG. 9C. The first display region includes a display region of the floating ball, and the first hot region may be the hot region 302 shown in FIG. 9C.

In some embodiments, the preset condition is that a second operation performed on the first window is detected, the second operation is for reducing display content of the first window, and the first display content includes all display content of the first window. According to embodiments of this application, after the second operation for reducing the first window visually is detected, the electronic device may reduce the hot region of the first window based on the display region of the reduced display content while reducing the display content of the first window, to increase the operable region for the user on the display screen and improve the screen utilization.

In some embodiments, that an electronic device displays a first window further includes: The electronic device displays the first window in full screen.

For example, refer to the related embodiment of the scenario 3. The first window may be a call window 401 displayed in full screen shown in FIG. 10A, and the first display content includes all display content of the call window 401. The electronic device 200 responds to the foregoing second operation. The electronic device 200 reduces all the display content of the call window 401, and visually reduces the call window 401 to the call window 401 shown in FIG. 10B. The electronic device 200 may determine that the hot region of the deformed call window 401 is the first hot region based on the first display region of the call window 401 shown in FIG. 10B. The first display region includes a display region of all the display content of the call window 401. The first hot region may be the hot region 402 shown in FIG. 10C or FIG. 10D.

In some embodiments, that an electronic device displays a first window includes: The electronic device displays the first window in a first user interface. The first user interface includes a fourth control. Before the hot region of the first window is reduced to the first hot region, the hot region of the first window covers a hot region of the fourth control. After the hot region of the first window is reduced to the first hot region, the hot region of the first window does not cover the hot region of the fourth control. According to embodiments of this application, when the display content of the window is reduced, the hot region of the first window may be reduced based on the display region of the reduced display content, to enable the fourth control originally covered by the hot region of the first window to receive and respond to the input operation of the user, thereby increasing the operable region for the user on the display screen, and improving the screen utilization.

For example, the fourth control may be an album icon 205A on the user interface 11 shown in FIG. 6A. As shown in FIG. 6A, the hot region 208 of the volume adjustment window 207 before deformation covers a hot region 209 of the album icon 205A. As shown in FIG. 6B and FIG. 6C, the hot region 208 of the volume adjustment window 207 after deformation partially covers or does not cover the hot region 209 of the album icon 205A. The album icon 205A shown in FIG. 6B or FIG. 6C may receive and respond to an input operation of the user, and display a user interface 12 of the album shown in FIG. 8B.

In some embodiments, compared with a size of a region occupied by the first window on the display screen before the electronic device reduces the first display content of the first window, a size of a region occupied by the first window on the display screen remains unchanged after the electronic device reduces the first display content of the first window.

In some embodiments, that the electronic device reduces the hot region of the first window to a first hot region based on the first display region includes: The electronic device reduces the hot region of the first window to the first hot region based on a position and a size of the first display region. The first hot region includes the first display region. It may be understood that the first hot region includes a display region of a response control in the first window, or the first hot region includes a display region of all display content of the first window.

In some embodiments, a size of the first hot region is greater than the size of the first display region. Embodiments of this application are implemented to avoid a situation in which the user cannot accurately operate the window when the display content of the first window is too small.

For example, as shown in FIG. 10D, the electronic device appropriately increases the size of the first hot region based on the display region of the display content of the call window 401. This can avoid a situation that when the display content of the call window 401 is too small, the user cannot smoothly restore the full-screen display state of the call window 401 by tapping the hot region of the call window 401.

In some embodiments, the first hot region is a region obtained through enlarging the first display region based on a preset proportion, or the first hot region is a region obtained through extending the first display region all around by a preset length. In embodiments of this application, the first hot region includes the first display region. When the size of the first hot region is less than the size of the first display region, how to determine the first hot region based on the first display region is not specifically limited.

It should be noted that, the preset proportion is a ratio of an area of the first hot region to the first display region. Alternatively, the preset proportion is a ratio of a width of the first hot region to a width of a second display region, or a ratio of a height of the first hot region to a height of a second display region. For example, the preset proportion may be 1.1, and the preset length may be a length of 10 pixels.

For example, as shown in FIG. 7A, after the display content 1 of the volume adjustment window 207B is reduced, the first display region is the same as the display region of the volume bar 207B. The electronic device determines that the hot region 208 of the volume adjustment window 207B is a region obtained through extending the display region of the volume bar 207B all around by a preset length.

In embodiments of this application, the electronic device may determine an initial state of the first window that is before the first display content is reduced and a final state of the first window in which the first display content is reduced. How the initial state of the first window changes to the final state of the first window is not limited herein. For example, in a change process, the display content of the first window may gradually change, jump, rotate, and/or change transparency.

In some embodiments, when the electronic device reduces first display content of the first window, the method further includes: increasing transparency of the first display content.

For example, the first display content is the foregoing display content 2. FIG. 6E shows a transparency change in a window deformation process of the volume adjustment window 207. Compared with transparency of the display content 2 shown in FIG. 6A, transparency of the display content 2 shown in FIG. 6E is increased.

In some embodiments, the first display content includes a second control and a third control, and when the electronic device reduces first display content of the first window, the method further includes: increasing transparency of the second control, and keeping transparency of the third control unchanged.

For example, as shown in FIG. 6A, the volume adjustment window 207 includes the volume panel 207A, the volume bar 207B, the speaker icon 207C, and the setting icon 207D. The second control includes the speaker icon 207C and the setting icon 207D, and the third control may include the panel 207A. FIG. 6D illustratively shows a transparency change in a window deformation process of the volume adjustment window 207. Compared with that shown in FIG. 6A, transparency of the volume panel 207A shown in FIG. 6D remains unchanged, and transparency of the speaker icon 207C and the setting icon 207D increases.

In some embodiments, the first display region includes display regions of all controls in the first window in which the first display content is reduced.

For example, the hot region of the first window is determined based on the first display region, and the hot region 208 shown in FIG. 6B and FIG. 6C includes display regions of all controls of the first window after deformation.

In some embodiments, that the electronic device reduces first display content of the first window includes: adjusting a display position of the first display content, and reducing a size of the first display content based on a display position and/or a size of the first control.

In some embodiments, after the electronic device reduces first display content of the first window, a display region of the first display content includes a display region of the first control. Alternatively, after the electronic device reduces first display content of the first window, a display region of the first control includes a display region of the first display content.

For example, the first control is the volume bar 207B, and the first display content is the foregoing display content 2. FIG. 6B is a volume adjustment window 207 after the display content 2 is reduced. A display region of the display content 2 shown in FIG. 6B includes a display region of a volume bar 207B. FIG. 6C is a volume adjustment window 207 after the display content 2 is reduced. The display region of the volume bar 207B shown in FIG. 6C includes a display region of the display content 2. In embodiments of this application, the size of the display content 2 may also be reduced to zero.

In some embodiments, when a size of the first display region is less than a first preset value, the size of the first hot region is determined based on the size of the first display region. When the size of the first display region is greater than or equal to the first preset value, the size of the first hot region may be determined in another manner, for example, determined based on a region occupied by the first window.

In some embodiments, that the electronic device reduces the hot region of the first window to a first hot region based on the first display region includes: when a size of the display regions of all the display content in the first window is less than a second preset value, the electronic device reduces the hot region of the first window to the first hot region based on the first display region. When a size of the display regions of all the display content in the first window is greater than or equal to the second preset value, the electronic device determines a task of the first window in another manner, for example, based on the region occupied by the first window. For example, when the first window is the volume adjustment window 207, the first preset value may be the preset value 2. When the first window is the call window 401, the first preset value may be the preset value 1.

In addition, in embodiments of this application, in a process in which the electronic device 100 reduces the first display content of the first window, the electronic device 100 implements deformation of the first window using the View animation based on the initial state and the final state of the first window, thereby effectively improving smoothness of window deformation.

Figure 13:
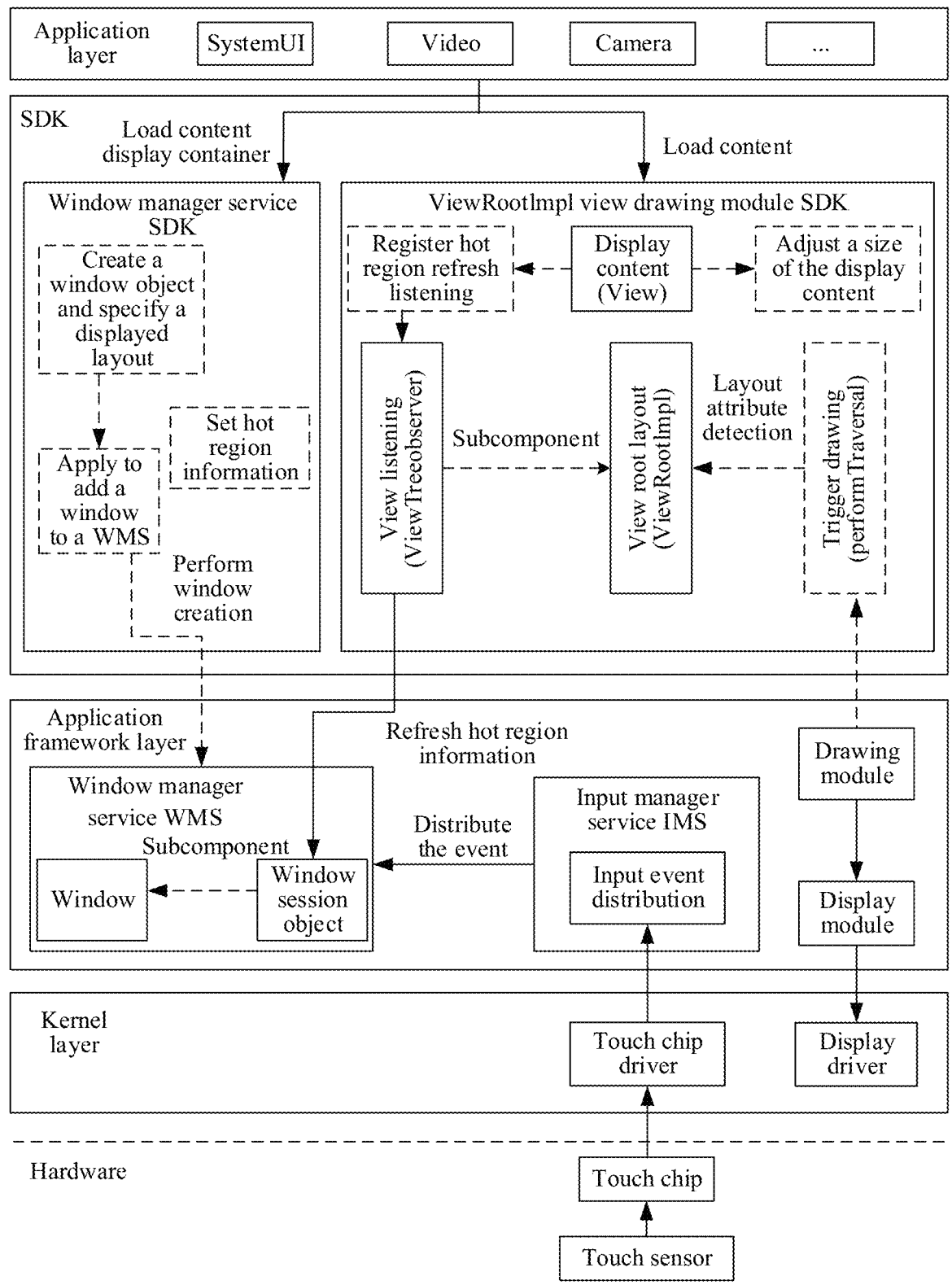
FIG. 13 is a block diagram of a software structure of an electronic device according to an embodiment of this application.

The following describes a software structure of the electronic device 100 in embodiments of this application with reference to FIG. 13.

In embodiments of this application, a software system of the electronic device 100 may use a layered architecture, an event-driven architecture, a micro kernel architecture, a micro service architecture, or a cloud architecture. In embodiments of this application, an Android system with a layered architecture is used as an example to illustratively describe a software structure of the electronic device 100.

Refer to FIG. 13. FIG. 13 illustratively shows a block diagram of a software structure of an electronic device 100 according to an embodiment of this application.

As shown in FIG. 13, a layered architecture divides software into several layers, with each having a clear role and responsibilities. The layers communicate with each other through software interfaces. In some embodiments, an Android system may be divided into application layers from top to bottom: an application framework layer, a hardware abstraction layer (HAL) layer, and a kernel layer (kernel).

The application layer includes a series of application packages, such as a System UI, a video, and a camera. The application layer may further include applications, such as a gallery, a call, and music.

The application framework layer provides an application programming interface (API) and a programming framework for the applications in the application layer. The application framework layer includes some predefined functions.

The Android Runtime includes a kernel library and a virtual machine. The Android runtime is responsible for scheduling and managing an Android system.

The kernel library includes two parts: one part being functional functions that java needs to call, and the other part being an Android kernel library.

The application layer and the application framework layer run in the virtual machine. The virtual machine executes java files of the application layer and the application framework layer as binary files. The virtual machine is configured to perform functions, such as object life cycle management, stack management, thread management, security and exception management, and garbage collection.

The kernel layer is a layer between hardware and software. The kernel layer may include a display driver, a sensor driver, and a touch IC driver, and may further include a camera driver, an audio driver, and the like. The HAL layer and the kernel layer (kernel) may perform corresponding operations in response to functions invoked by the application framework layer.

A software development kit (SDK) shown in FIG. 13 refers to: a collection of development tools that create application software for specific software packages, software frameworks, hardware platforms, operating systems, etc.

The application framework layer may include: a window manager service (WMS), a window session object, an input manager service (IMS), a drawing module, and a display module.

The window manager service is a system service of the Android system that controls the display and hiding of all windows. The window manager service allocates interfaces to all windows, manages the display sequence, size, and position of the interfaces, and controls the window animation. The window manager service is an important transfer station for an input system. Each window in the window manager service includes a window session object corresponding to the window, and the window session object is used to store hot region information (that is, a display position and a size of the hot region) of the window. When creating a window, the window manager service registers hot region refresh listening of the window to a view listening module of a view root layout.

The view root layout (ViewRootlmpl) is used to manage a root View of the window and implement a ViewParent interface. The view root layout controls the measurement (measure), layout, and drawing (draw) of the View. Distribution interaction of all window events is performed or transferred through the view root layout. In addition, the view root layout communicates with the window manager service through the window session object, and uses an IWindow as a callback interface of the window manager service. The view root layout includes the view listening module, and the view listening module is configured to listen to a View tree corresponding to the window.

Figure 2:
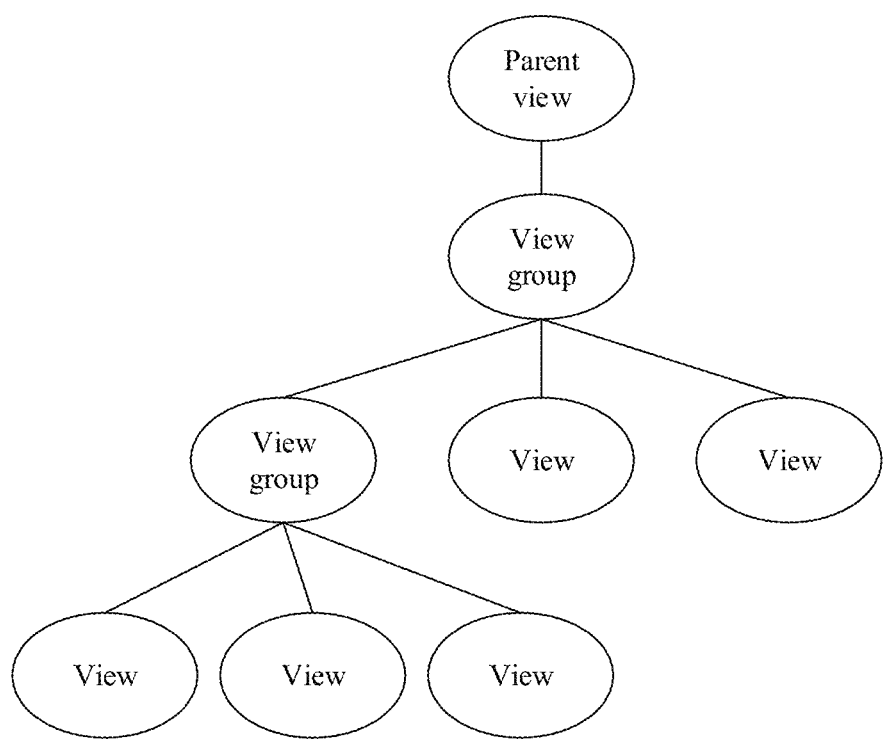
FIG. 2 is a schematic structural diagram of a View tree according to an embodiment of this application.

The View tree is as follows: A view (View) and a view group (ViewGroup) may form all controls on the user interface into a tree structure, that is, the View tree. As shown in FIG. 2, there is a parent view (ViewParent) object at the top of each View tree as a core of the View tree. All interaction management events are uniformly scheduled and allocated by the parent view object, to control the entire view. The view is a base class of all controls in the Android system. The view group represents a collection of controls. The view group includes one or more views. The view group can also include another view group.

The input manager service is configured to manage input events in the electronic device 100.

The drawing module is configured to draw the window based on the View tree corresponding to the window. In an embodiment, when the electronic device 100 displays an interface of an application run in the foreground, the drawing module periodically invokes the view root layout to draw the display content.

The display module is configured to determine display content of the window.

The following illustratively describes a working flow of a window display method in the electronic device 100.

In some embodiments of this application, the electronic device 100 receives an input operation of the user, sends related information of the input operation (for example, interruption information of a volume button) to the input manager service, and identifies that an input event corresponding to the input operation is displaying the first window (for example, the volume adjustment window 207). The input manager service then distributes the input event to the window manager service.

The window manager service invokes the first window based on the input event. It should be noted that, before receiving the input event, the window manager service may create a window object of the first window based on the SDK of the window manager service, and specify a view layout of the first window. The window session object of the first window stores hot region information of the first window. Then, the first window is added to the window manager service to complete creating the first window, and the hot region refresh listening of the first window may be registered to the view listening module of the view root layout when the first window is created.

The drawing module triggers drawing of the first window, and further triggers the view root layout to invoke a perform Traversals( ) function to perform layout attribute detection and drawing on the first window, and sends drawing data of the first window to the display module. The display module determines display content of the first window based on the drawing data of the first window, and the display module drives the display screen 194 to display the first window by invoking a display driver of the kernel layer.

In some embodiments of this application, the touch sensor 180K receives a touch operation. A corresponding hardware interrupt is sent to a touch chip, and the touch chip sends touch information of the touch operation to a touch chip driver at the kernel layer. The touch chip driver sends the touch information to the input system. The input system processes the touch operation into an original input event (including information such as a touch coordinate and a time stamp of the touch operation). The original input event is stored at the kernel layer. The input manager service obtains the original input event from the kernel layer, and determines that the original input event is the first control acting on the first window. The input manager service distributes the input event to an application 1 corresponding to the first window. The application 1 may determine a display position and a size of the reduced display content of the first window based on the display position and the size of the first control; and determine a position and a size of the reduced hot region of the first window based on the display position and the size of the reduced display content. The application 1 may send the display content after the first window is reduced and related information (the position and the size) of the hot region to the view listening module corresponding to the first window. The view listening module sends the related information of the hot region after the first window is reduced to the window session object of the first window, and updates the related information of the hot region of the first window in the window session object. The view root layout invokes an animation (for example, view animation) function to determine a view layout corresponding to the first window in each refresh cycle in a process in which the first window is deformed from an initial state to a final state.

The drawing module periodically triggers drawing, triggers the view root layout to invoke a perform Traversals( ) function to perform layout attribute detection and drawing on the first window, and sends drawing data to the display module, thereby displaying a deformation process of the first window. When the view root layout invokes the perform Traversals( ) function to perform layout attribute detection on the first window, the view root layout invokes hot region refresh listening of the first window to obtain display content of the first window at the current moment and related information of the hot region. In an embodiment, the hot region refresh listening of the first window reads the display content of the first window and the related information of the hot region from onComputeInternalInserts.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in embodiments may be performed. The foregoing storage medium includes: any medium that can store program code, such as a ROM, a random access memory RAM, a magnetic disk, or an optical disc.

The foregoing embodiments are merely used to describe the technical solutions of this application, but not to limit the technical solutions. Although this application is described in detail with reference to the foregoing embodiments, a person of ordinary skill in the art should understand that: The technical solutions recorded in the foregoing embodiments may still be modified, or some technical features thereof may be equivalently replaced. However, these modifications or replacements do not cause the essence of the corresponding technical solutions to depart from the scope of the technical solutions in embodiments of this application.

The invention claimed is:

1. A window display method, comprising:
displaying, by an electronic device, a first window; and
determining, by the electronic device, a hot region of the first window based on a first display region of the first window, wherein the first display region comprises a display region of a response control in the first window, and the response control is a control capable of responding to a touch operation;
wherein before the determining, by the electronic device, the hot region of the first window based on the first display region of the first window, the method further comprises:
reducing, by the electronic device, first display content of the first window based on the first window satisfying a preset condition;
wherein the determining, by the electronic device, the hot region of the first window based on the first display region of the first window comprises:
reducing, by the electronic device, the hot region of the first window to a first hot region based on the first display region, wherein the first display region comprises the display region of the response control in the first window in which the first display content is reduced; and
wherein the hot region is smaller than a region occupied by the first window and/or the hot region is larger than the first display region.

2. The method according to claim 1, wherein the first window comprises a first control, the preset condition is that a first operation performed on the first control in the first window is detected, and the first display content comprises display content other than the first control in the first window.

3. The method according to claim 1, wherein the preset condition is that no input operation performed on the first window is detected within a preset duration.

4. The method according to claim 3, wherein the first window is a floating ball window, and the first display content is a floating ball in the floating ball window.

5. The method according to claim 1, wherein the preset condition is that a second operation performed on the first window is detected, the second operation is for reducing display content of the first window, and the first display content comprises all display content of the first window.

6. The method according to claim 5, wherein the displaying, by the electronic device, the first window comprises:
displaying, by the electronic device, the first window in full screen.

7. The method according to claim 1, wherein the displaying, by the electronic device, the first window comprises:
displaying, by the electronic device, the first window in a first user interface;
wherein:
the first user interface comprises a fourth control;
before the hot region of the first window is reduced to the first hot region, the hot region of the first window covers a hot region of the fourth control; and
after the hot region of the first window is reduced to the first hot region, the hot region of the first window does not cover the hot region of the fourth control.

8. The method according to claim 1, wherein compared with a size of a region occupied by the first window on a display screen before the electronic device reduces the first display content of the first window, a size of a region occupied by the first window on the display screen remains unchanged after the electronic device reduces the first display content of the first window.

9. The method according to claim 1, wherein the reducing, by the electronic device, the hot region of the first window to the first hot region based on the first display region comprises:
reducing, by the electronic device, the hot region of the first window to the first hot region based on a position and a size of the first display region, wherein the first hot region comprises the first display region.

10. The method according to claim 1, wherein based on a size of the first display region being less than a first preset value, a size of the first hot region is determined based on the size of the first display region.

11. The method according to claim 10, wherein the first hot region is a region obtained through enlarging the first display region based on a preset proportion, or the first hot region is a region obtained through extending the first display region all around by a preset length.

12. The method according to claim 1, wherein when-based on the electronic device reducing the first display content of the first window, the method further comprises:
increasing transparency of the first display content.

13. The method according to claim 1, wherein the first display content comprises a second control and a third control, and based on the electronic device reducing the first display content of the first window, the method further comprises:
increasing transparency of the second control, and keeping transparency of the third control unchanged.

14. The method according to claim 1, wherein the first display region comprises display regions of all controls in the first window in which the first display content is reduced.

15. An electronic device, comprising one or more processors, a memory, and a display screen, wherein the memory and the display screen are coupled to the one or more processors, the memory is configured to store computer program code, the computer program code comprises computer instructions, and the one or more processors are configured to invoke the computer instructions, to enable the electronic device to implement operations comprising:
displaying a first window; and
determining a hot region of the first window based on a first display region of the first window, wherein the first display region comprises a display region of a response control in the first window, and the response control is a control capable of responding to a touch operation;
wherein before the determining the hot region of the first window based on the first display region of the first window, the operations further comprise:
reducing first display content of the first window based on the first window satisfying a preset condition;
wherein the determining the hot region of the first window based on the first display region of the first window comprises:
reducing the hot region of the first window to a first hot region based on the first display region, wherein the first display region comprises the display region of the response control in the first window in which the first display content is reduced; and
wherein the hot region is smaller than a region occupied by the first window and/or the hot region is larger than the first display region.

* * * * *